US010476909B1

(12) United States Patent
Aziz et al.

(10) Patent No.: US 10,476,909 B1
(45) Date of Patent: *Nov. 12, 2019

(54) SYSTEM, APPARATUS AND METHOD FOR AUTOMATICALLY VERIFYING EXPLOITS WITHIN SUSPECT OBJECTS AND HIGHLIGHTING THE DISPLAY INFORMATION ASSOCIATED WITH THE VERIFIED EXPLOITS

(71) Applicant: FireEye, Inc., Milpitas, CA (US)

(72) Inventors: Ashar Aziz, Coral Gables, FL (US); Muhammad Amin, Milpitas, CA (US); Osman Abdoul Ismael, Palo Alto, CA (US); Zheng Bu, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 15/298,159

(22) Filed: Oct. 19, 2016

Related U.S. Application Data

(63) Continuation of application No. 14/228,073, filed on Mar. 27, 2014, now Pat. No. 9,756,074.

(Continued)

(51) Int. Cl.
G06F 21/56 (2013.01)
H04L 29/06 (2006.01)
G06F 9/455 (2018.01)

(52) U.S. Cl.
CPC ...... H04L 63/1491 (2013.01); G06F 9/45558 (2013.01); G06F 21/564 (2013.01);
(Continued)

(58) Field of Classification Search
CPC .............................. G06F 21/56–568
See application file for complete search history.

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

EP 2106085 A1 9/2009
GB 2439806 A 1/2008
(Continued)

OTHER PUBLICATIONS

Vomel et al., "Visualizing Indicators of Rootkit Infections in Memory Forensics", pp. 122-139 (Year: 2013).*
(Continued)

Primary Examiner — Thaddeus J Plecha
(74) Attorney, Agent, or Firm — Rutan & Tucker, LLP

(57) ABSTRACT

According to one embodiment, a threat detection system comprising an intrusion protection system (IPS) logic, a virtual execution logic and a reporting logic is shown. The IPS logic is configured to receive a first plurality of objects and analyze the first plurality of objects to identify a second plurality of objects as potential exploits, the second plurality of objects being a subset of the first plurality of objects and being lesser or equal in number to the first plurality of objects. The virtual execution logic including at least one virtual machine configured to process content within each of the second plurality of objects and monitor for anomalous behaviors during the processing that are indicative of exploits to classify that a first subset of the second plurality of objects includes one or more verified exploits. The reporting logic configured to provide a display of exploit information associated with the one or more verified exploits.

32 Claims, 14 Drawing Sheets

Related U.S. Application Data

(60) Provisional application No. 61/921,033, filed on Dec. 26, 2013.

(52) U.S. Cl.
CPC ........ G06F 21/566 (2013.01); H04L 63/1433 (2013.01); G06F 2009/45587 (2013.01); G06F 2221/033 (2013.01); H04L 63/145 (2013.01); H04L 63/1416 (2013.01)

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,437,764 B1 | 10/2008 | Sobel et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |

(56) References Cited

U.S. PATENT DOCUMENTS

| | | |
|---|---|---|
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,869,281 B2 | 10/2014 | Call et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,943,594 B1 | 1/2015 | Arrowood |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,158,915 B1 * | 10/2015 | Yumer .................. G06F 21/566 |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 * | 4/2016 | Aziz ....................... G06F 21/56 |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,903 B1 * | 3/2017 | L ............................ G06F 21/561 |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,861 B2 * | 6/2017 | Ward .................. H04L 63/1441 |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 * | 9/2017 | Aziz ....................... G06F 21/56 |
| 9,773,112 B1 | 9/2017 | Rathor et al. |
| 9,781,144 B1 | 10/2017 | Dtvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |

(56) References Cited

U.S. PATENT DOCUMENTS

| | | |
|---|---|---|
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1* | 10/2005 | Gassoway ............ G06F 21/552 713/188 |
| 2005/0262562 A1 | 11/2005 | Gassoway |
| 2005/0265331 A1 | 12/2005 | Stolfo |
| 2005/0273856 A1 | 12/2005 | Huddleston |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |

(56) References Cited

U.S. PATENT DOCUMENTS

| | | |
|---|---|---|
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0094731 A1* | 4/2007 | Teodosiu ............... G06F 21/562 726/24 |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0016208 A1* | 1/2008 | Treinen ............... H04L 63/1416 709/224 |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0320136 A1* | 12/2009 | Lambert ............... G06F 21/554 726/25 |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058470 A1* | 3/2010 | Kim ..................... G06F 21/56 726/22 |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1* | 5/2010 | Staniford ............ H04L 63/1416 726/25 |
| 2010/0128862 A1 | 5/2010 | Vendrow |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0287613 A1 | 11/2010 | Singh et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |

(56) References Cited

U.S. PATENT DOCUMENTS

| | | |
|---|---|---|
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321166 A1 | 12/2011 | Capalik et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0278889 A1 | 11/2012 | El-Moussa |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0091570 A1 | 4/2013 | McCorkendale et al. |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0111591 A1* | 5/2013 | Topan .................. G06F 21/563 726/24 |
| 2013/0117849 A1* | 5/2013 | Golshan ................. G06F 21/53 726/23 |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0068775 A1 | 3/2014 | Ward et al. |
| 2014/0082733 A1 | 3/2014 | Benefield |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0173739 A1 | 6/2014 | Ahuja et al. |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351810 A1* | 11/2014 | Pratt .................. G06F 9/45545 718/1 |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0089647 A1 | 3/2015 | Palumbo et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121526 A1* | 4/2015 | McLarnon .............. H04L 63/14 726/23 |
| 2015/0135317 A1 | 5/2015 | Tock et al. |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0244732 A1 | 8/2015 | Golshan et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| GB | 2490431 A | 10/2012 |
| GB | 2518636 B | 3/2016 |
| WO | 02/23805 A2 | 3/2002 |
| WO | 02/006928 A2 | 8/2003 |
| WO | 0206928 | 11/2003 |

(56) References Cited

FOREIGN PATENT DOCUMENTS

| WO | 2007117636 A2 | 10/2007 |
|---|---|---|
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", Infocom, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

PCT/US2014/072292 filed Dec. 23, 2014 International Preliminary Report dated Jul. 7, 2016.

PCT/US2014/072292 filed Dec. 23, 2014 International Search Report and Written Opinion dated Feb. 23, 2015.

PCT/US2015/037245 filed Jun. 23, 2015 International Search Report and Written Opinion dated Sep. 17, 2015.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 14/228,073, filed Mar. 27, 2014 Final Office Action dated Nov. 13, 2015.

U.S. Appl. No. 14/228,073, filed Mar. 27, 2014 Final Office Action dated Nov. 4, 2016.

U.S. Appl. No. 14/228,073, filed Mar. 27, 2014 Non-Final Office Action dated Jun. 15, 2015.

U.S. Appl. No. 14/228,073, filed Mar. 27, 2014 Non-Final Office Action dated Jun. 9, 2016.

U.S. Appl. No. 14/313,934, filed Jun. 24, 2014 Non-Final Office Action dated Sep. 30, 2015.

U.S. Appl. No. 14/620,055, filed Feb. 11, 2015 Non-Final Office Action dated Jun. 15, 2015.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

EP 15810978.5 filed Jan. 24, 2017 Supplementary European Search Report dated Dec. 18, 2017.

JP 2016-561597 filed Jun. 27, 2016 Notice of Allowance dated Oct. 23, 2018.

Paolo Palumbo, Distributed Sample Anaylsis, GB 1317085.7, Sep. 26, 2013.

U.S. Appl. No. 14/313,934, filed Jun. 24, 2014 Final Office Action dated Apr. 22, 2016.

U.S. Appl. No. 14/313,934, filed Jun. 24, 2014 Final Office Action dated Mar. 22, 2017.

U.S. Appl. No. 14/313,934, filed Jun. 24, 2014 Non-Final Office Action dated Nov. 2, 2017.

U.S. Appl. No. 14/313,934, filed Jun. 24, 2014 Non-Final Office Action dated Sep. 23, 2016.

U.S. Appl. No. 14/313,934, filed Jun. 24, 2014 Notice of Allowance dated May 22, 2018.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Adobe Systems Incorporated, "PDF 32000-1:2008, Document management—Portable document format—Part1:PDF 1.7", First Edition, Jul. 1, 2008, 756 pages.

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

(56) References Cited

OTHER PUBLICATIONS

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "Extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 3.3" RFC 1950, (1996).

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, "Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hjelmvik, Erik , "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King") (2003).

Krasnyansky, Max , et al., Universal TUN/TAP driver, available at https://www.kernel.org/doc/Documentation/networking/tuntap.txt (2002) ("Krasnyansky").

Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael , et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/ files/conference/usenixsecurity12/sec12- -final107.pdf [retrieved on Dec. 15, 2014].

EP 14830461.1 filed Jun. 27, 2016 Office Action dated Mar. 28, 2019.

U.S. Appl. No. 16/140,328, filed Sep. 24, 2018 Final Office Action dated Jun. 26, 2019.

"Mining Specification of Malicious Behavior"—Jha et al, UCSB, Sep. 2007 https://www.cs.ucsb.edu/.about.chris/research/doc/esec07.sub.--mining.pdf-.

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Hiroshi Shinotsuka, Malware Authors Using New Techniques to Evade Automated Threat Analysis Systems, Oct. 26, 2012, http://www.symantec.com/connect/blogs/, pp. 1-4.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Lastline Labs, The Threat of Evasive Malware, Feb. 25, 2013, Lastline Labs, pp. 1-8.

(56) References Cited

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

* cited by examiner

SYSTEM, APPARATUS AND METHOD FOR AUTOMATICALLY VERIFYING EXPLOITS WITHIN SUSPECT OBJECTS AND HIGHLIGHTING THE DISPLAY INFORMATION ASSOCIATED WITH THE VERIFIED EXPLOITS

CROSS-REFERENCE TO RELATED APPLICATIONS

This application claims the benefit of priority on U.S. patent application Ser. No. 14/228,073 filed Mar. 27, 2014, which claims the benefit of priority on U.S. Provisional Application No. 61/921,033, filed Dec. 26, 2013, the entire contents of which are incorporated by reference herein.

FIELD

Embodiments of the disclosure relate to the field of network security. More specifically, one embodiment of the disclosure relates to a system, apparatus and method for identifying a suspicious object, automatically verifying the suspect object as an exploit through virtual processing.

GENERAL BACKGROUND

Over the last decade, malicious software has become a pervasive problem for Internet users as most networked resources include software vulnerabilities that are subject to attack. For instance, over the past few years, more and more vulnerabilities are being discovered in software that is loaded onto network devices, such as vulnerabilities within operating systems for example. While some vulnerabilities continue to be addressed through software patches, prior to the release of such software patches, network resources continue to be the targeted by exploits.

In general, an exploit is information that attempts to take advantage of a vulnerability in computer software by adversely influencing or attacking normal operations of a targeted computer. As an illustrative example, a Portable Execution Format (PDF) file may be infected with an exploit that is activated upon execution (opening) of the PDF file and takes advantage of a vulnerability associated with Acrobat® Reader version 9.0.

Currently, one type of security application widely used for detecting exploits is an intrusion prevention system (IPS). Typically implemented as part of a firewall, an IPS is designed to identify packets suspected of containing known exploits, attempt to block/halt propagation of such exploits, and log/report information associated with such packets through an alert. However, conventional IPS technology suffers from a number of disadvantages.

One disadvantage with conventional IPS technology in that the IPS does not rely on any mechanism to automatically verify its results. Rather, verification of the results produced from a conventional IPS is handled manually.

Another disadvantage is that, without automated verification, the IPS tends to produce a large number of false positives, namely incorrect alerts that occur when the IPS reports certain benign objects as exploits. These false positives cause a variety of adverse effects. For instance, due to the large number of false positives, one adverse effect is that actual exploits detected within network traffic may go unnoticed by an administrator. Other adverse effects may include (i) needless blocking of incoming network traffic; (ii) unnecessarily reduction of processing resources; (iii) significant drainage of administrative resources to handle incorrectly classified objects; and (iv) development of a culture (or policy) of sporadically checking only some of the suspect objects.

In efforts to mitigate the number of false positives, the IPS may frequently require customized and periodic tuning of its signature database, which is a costly endeavor. Furthermore, simply tuning the IPS to significantly reduce the number of false positives can severely degrade the effectiveness of the IPS and/or severely disrupt network operability.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
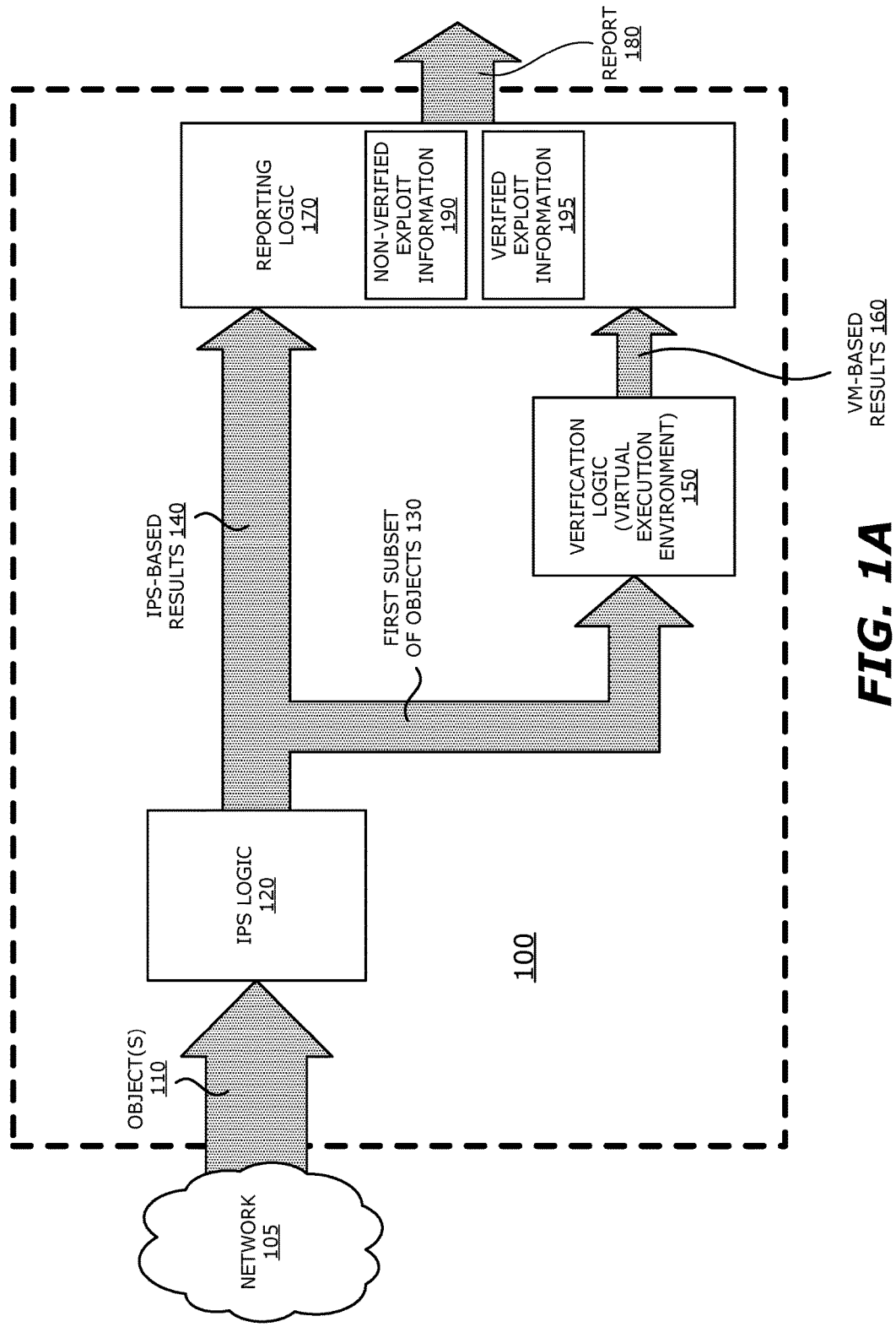
FIG. 1A is a first exemplary block diagram of an operational flow of threat detection and prevention within an electronic device.

Various embodiments of the disclosure relate to an electronic device with network connectivity, such as a threat detection and prevention (TDP) system for example, where the electronic device comprises a static analysis engine, a dynamic analysis engine and reporting logic. According to one embodiment of the disclosure, the static analysis engine comprises intrusion protection system (IPS) logic that conducts at least exploit signature checks and/or vulnerability signature checks on objects under analysis to identify whether characteristics of any of these objects are indicative of an exploit. Those objects with these identified characteristics are label "suspect" or "suspicious" objects. The dynamic analysis engine comprises virtual execution logic to automatically and subsequently analyze, without user assistance, content within suspect objects provided from the IPS logic in order to possibly verify whether any of the suspect objects is an exploit.

Based on analysis results from the IPS logic and the virtual execution logic, reporting logic within the TDP system generates a report (e.g., one or more display screens, printed report, etc.) that highlights information associated with these "verified" exploits, namely suspect objects initially identified by the IPS logic that have been verified by the virtual execution logic to be exploits. Some or all of the information associated with the verified exploits (referred to as "verified exploit information") may be highlighted to visibly denote the verified exploits from the non-verified exploits, namely suspect objects initially identified by the IPS logic that have not been verified by the virtual execution logic. Examples as to how the verified exploit information is highlighted may include (1) altering location or ordering of at least certain portions of the verified exploit information to prominently display such information within the report; (2) modifying the font (e.g. color, size, type. style, and/or effects) used in conveying some of the verified exploit information; (3) placement of one or more images proximate to a listing of the verified exploit information; or the like.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stoned in persistent storage.

The term-object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence an exploit and potentially allow the object to be classified as an exploit.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include packets, frames, or cells.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g. Remote Procedure Call "RPC" or analogous processes, etc.). Similar, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

An "exploit" may be construed broadly as information (e.g., executable code, data, command(s), etc.) that attempts to take advantage of a software vulnerability. Typically, a "vulnerability" is a coding error or artifact of software (e.g., computer program) that allows an attacker to alter legitimate control flow during processing of the software (computer program) by an electronic device, and thus, causes the electronic device to experience undesirable or unexpected behaviors. The undesired or unexpected behaviors may include a communication-based anomaly or an execution-based anomaly, which, for example, could (1) alter the functionality of an electronic device executing application software in a malicious manner; (2) alter the functionality of the electronic device executing that application software without any malicious intent; and/or (3) provide unwanted functionality which may be generally acceptable in another context. To illustrate, a computer program may be considered as a state machine, where all valid states (and transitions between states) are managed and defined by the program, in which case an exploit may be viewed as seeking to alter one or more of the states (or transitions) from those defined by the program.

Malware may be construed broadly as computer code that executes an exploit to take advantage of a vulnerability, for example, to harm or co-opt operation of an electronic device or misappropriate, modify or delete data. Conventionally, malware is often said to be designed with malicious intent. An object may constitute or contain malware.

The term "transmission medium" is a physical or logical communication path between two or more electronic devices (e.g., any devices with data processing and network connectivity such as, for example. a security appliance, a server, a mainframe, a computer such as a desktop or laptop, netbook, tablet, firewall, smart phone, router, switch, bridge, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the terms "detected" and "verified" are used herein to represent that there is a prescribed level of confidence (or probability) on the presence of an exploit within an object under analysis. For instance, the IPS logic (described below) "detects" a potential exploit by examining characteristics or features of an object under analysis, and, in response, determining whether the object has characteristics indicative of an exploit (a "suspect object"). This determination may be conducted through analysis as to whether there exists at least a first probability of the object under analysis being an exploit. Likewise, the virtual execution logic "verifies" the presence of the exploit by monitoring or observing unexpected or anomalous behaviors or activities, and, in response, determining that suspect object is an exploit. According to one embodiment of the disclosure, the determination by the virtual execution logic may involve an analysis as to whether there exists a second probability of the suspect exploit being an exploit. The second probability may be greater than the first probability and may take into account the first probability.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

Lastly, the terms "or" and "and/or" as used herein are to be interpreted as inclusive or meaning any one or any combination. Therefore, "A, B or C" or "A, B and/or C" mean "any of the following: A; B; C; A and 13; A and C; B and C; A, B and C." An exception to this definition will occur only when a combination of elements, functions, steps or acts are in some way inherently mutually exclusive.

The invention may be utilized for detection, verification and/or prioritization of malicious content such as exploits. As this invention is susceptible to embodiments of many different forms, it is intended that the present disclosure is to be considered as an example of the principles of the invention and not intended to limit the invention to the specific embodiments shown and described.

II. First Embodiment—IPS Logic with Virtual Execution Logic Verification

A. Communication Flow

Referring to FIG. 1A, an exemplary block diagram of an operational flow of threat detection and prevention within an electronic device 100 is shown. Herein, some or all of the incoming objects 110 associated with monitored network traffic are received by IPS logic 120, which is part of the static analysis engine of FIGS. 2A-2B for example. The IPS logic 120 is configured as a capture and filter device that receives the incoming objects 110 and filters, using at least exploit signatures and/or vulnerability signatures, which objects are to be provided for more in-depth analysis. The exploit signatures and/or vulnerability signatures may be updated in a periodic or aperiodic manner.

More specifically, a suspected exploit may be detected by conducting exploit signature checks and/or vulnerability signature checks, namely comparing an object under analysis to one or more pre-stored exploit signatures and/or vulnerability signatures to determine if a match is detected. In general, an "exploit signature" includes information directed to a previously detected or known attack pattern while a "vulnerability signature" includes information that characterizes a potential attempt to capitalize on a previously detected or known vulnerability, even when no specific exploit for that vulnerability is known. According to one embodiment of the disclosure, the vulnerability signature may be considered a protocol state machine that maintains state and is normally configured to define parameters for an object being a set of flows that represent an attempt being made to capitalize on a particular software vulnerability that the vulnerability signature is attempting to protect.

Upon conducting at least exploit signature checks and/or vulnerability signature checks on the incoming objects 110 and identifying a first subset of objects 130 having characteristics indicative of an exploit ("suspect objects"), the IPS logic 120 provides the first set of suspect objects 130 to verification logic 150 and provides results 140 of its analysis (referred to herein as "IPS-based results") to reporting logic 170 for storage and subsequent access.

It is contemplated that the first subset of objects 130 may be lesser in number (and potentially significantly less in number) than the incoming objects 110. For example, while the first subset of objects 130 may be a stream of objects. for ease of discussion in this section, the first subset of objects 130 may refer to at least one incoming object initially suspected of being an exploit (e.g., a suspect object matches a pre-stored exploit signature or a vulnerability signature). Hence, the IPS logic 120 routes the suspect object 130 to verification logic 150 and outputs the IPS-based results 140 associated with suspect object 130 to reporting logic 170.

The IPS-based results 140 may provide details directed to one or more suspected exploits within the suspect object 130. As an example, the details may include (i) an exploit identifier such as a particular name/family of the suspected exploit (if known); (ii) source address (e.g., Uniform Resource Locator "URL", Internet Protocol "IP" address, etc.) of the electronic device sending the suspect object; (iii) time of analysis; (iv) information associated with anticipated anomalous activities that may be conducted by the suspected exploit; (v) information regarding anticipated communication deviations from the protocol applicable to the network traffic; and/or (vi) recommended remediation techniques for this type of exploit.

Figure 2A:
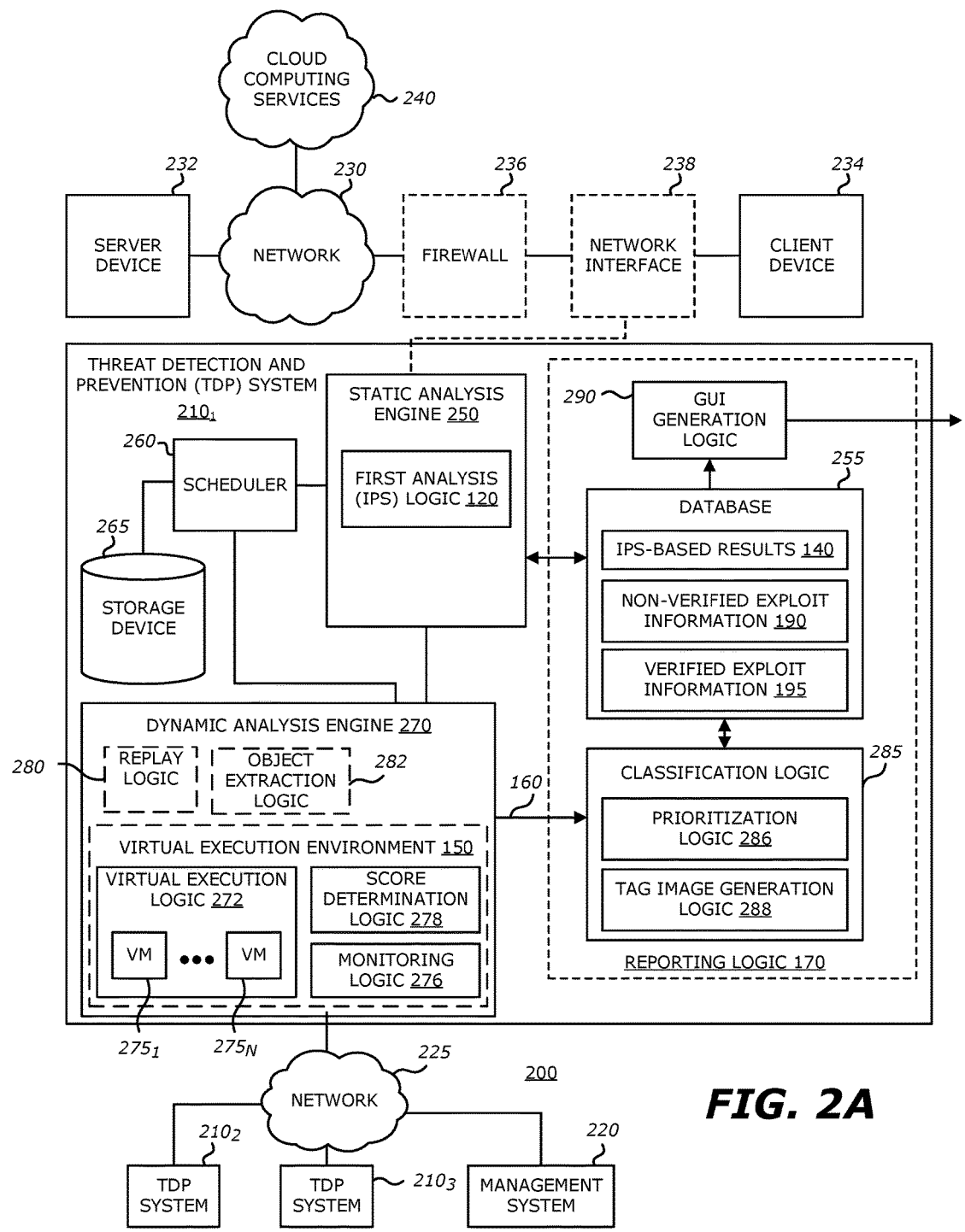
FIG. 2A is a first exemplary block diagram of a communication system deploying a plurality of threat detection and prevention (TDP) systems with framework for conducting exploit analysis using intrusion protection system (IPS) logic with results verified by virtual execution logic.
Figure 2B:
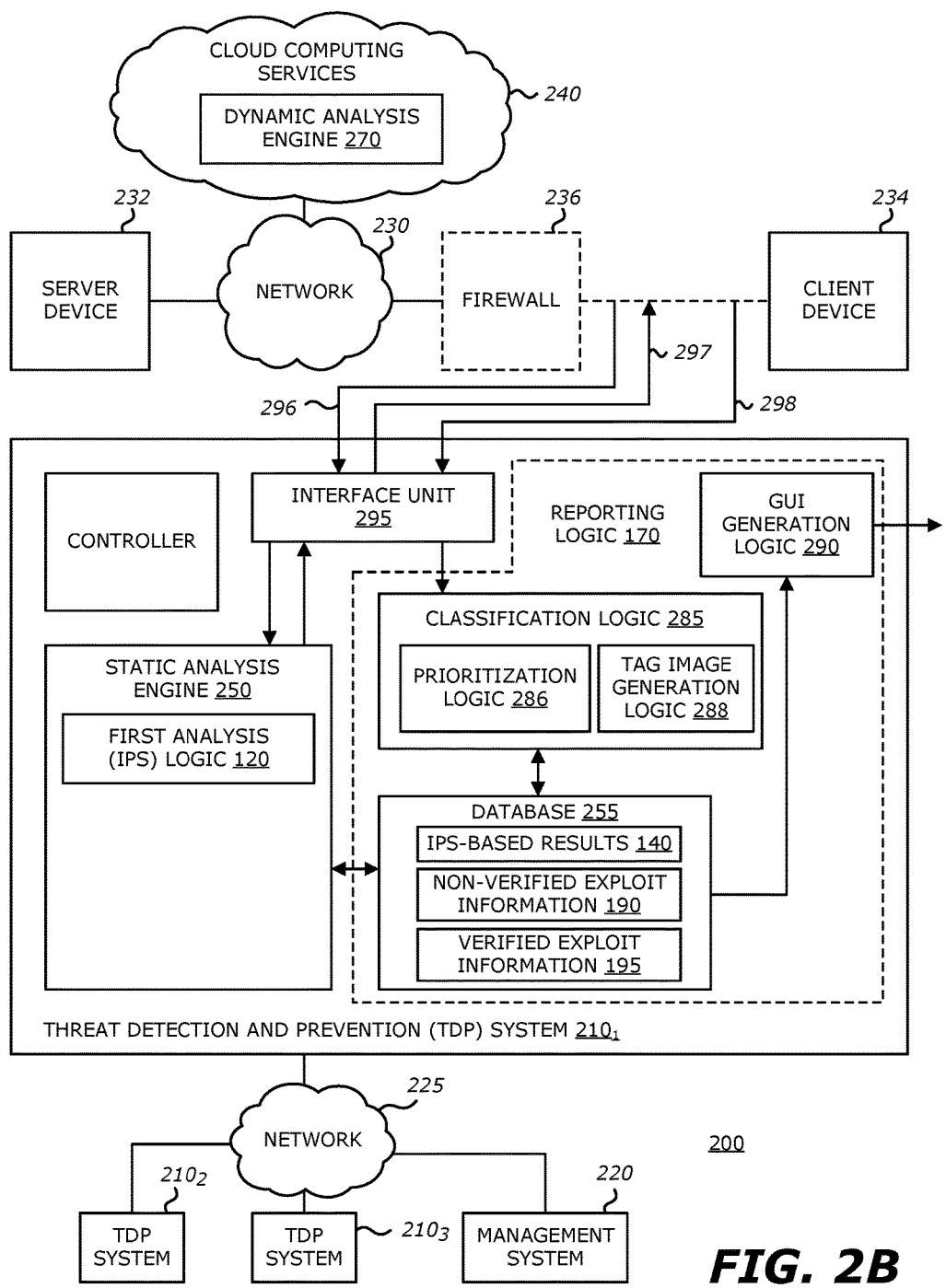
FIG. 2B is a second exemplary block diagram of a communication system deploying a plurality of TDP systems with framework for conducting exploit analysis using IPS logic with results verified by virtual execution logic.

As mentioned above, the suspect object 130 is routed to verification logic 150 (e.g., virtual execution logic being part of a dynamic analysis engine 270 as illustrated in FIGS. 2A-2B). The verification logic 150 attempts to verify whether the suspect object 130 is an exploit by virtual processing content within the suspect object 130 and monitoring behaviors during such virtual processing, as described below.

The results 160 of this analysis are output from the verification logic 150 for subsequent use by reporting logic 170 in generating a report 180 that visibly denotes and filters the suspect objects from the first set of objects 130 that have been verified (verified exploits) from those suspect objects from the first set of objects 130 that have not been verified (non-verified exploits). Although not illustrated in FIG. 1A, the VM-based results 160 may include (1) the suspect object; (2) time of analysis; (3) one or more scores that may be used to verify that the suspect object is likely an exploit, and if so: (i) the exploit identifier; (ii) characteristics or anomalous behaviors associated with the verified exploit, which may include video/images of anomalous behaviors; and/or (iii) name and/or version number of software detected to be vulnerable to the verified exploit.

Thereafter, at least portions of the IPS-based results 140 and the VM-based results 160 for the suspect object are combined. More specifically, in the event that the VM-based results 160 indicate that the verification logic 150 failed to verify that the suspect object 130 is an exploit (e.g., a computed score below a prescribed threshold), some or all of the IPS-based results 140 and the VM-based results 160 for that object are combined and added as part of "non-verified exploit information" 190 for storage and use by the reporting logic 170.

However, when the VM-based results 160 indicate that the verification logic 150 has verified that the suspect object 130 is an exploit (e.g., the computed score is equal to or above a prescribed threshold), some or all of the IPS-based results 140 and the VM-based results 160 may be modified to achieve a highlighted display of at least the verified exploits. For example, certain portions of the results 140 and/or 160 may be associated with display commands, which are recognized by a display controller being part of display logic within the reporting logic 170 and causes the display logic to produce an output that may visibly denotes differences between displayed results associated with verified exploits from displayed results associated with the non-verified exploits. This exploit information associated with the verified exploit may be stoned as part of the "verified exploit information" 195.

Figure 5A:
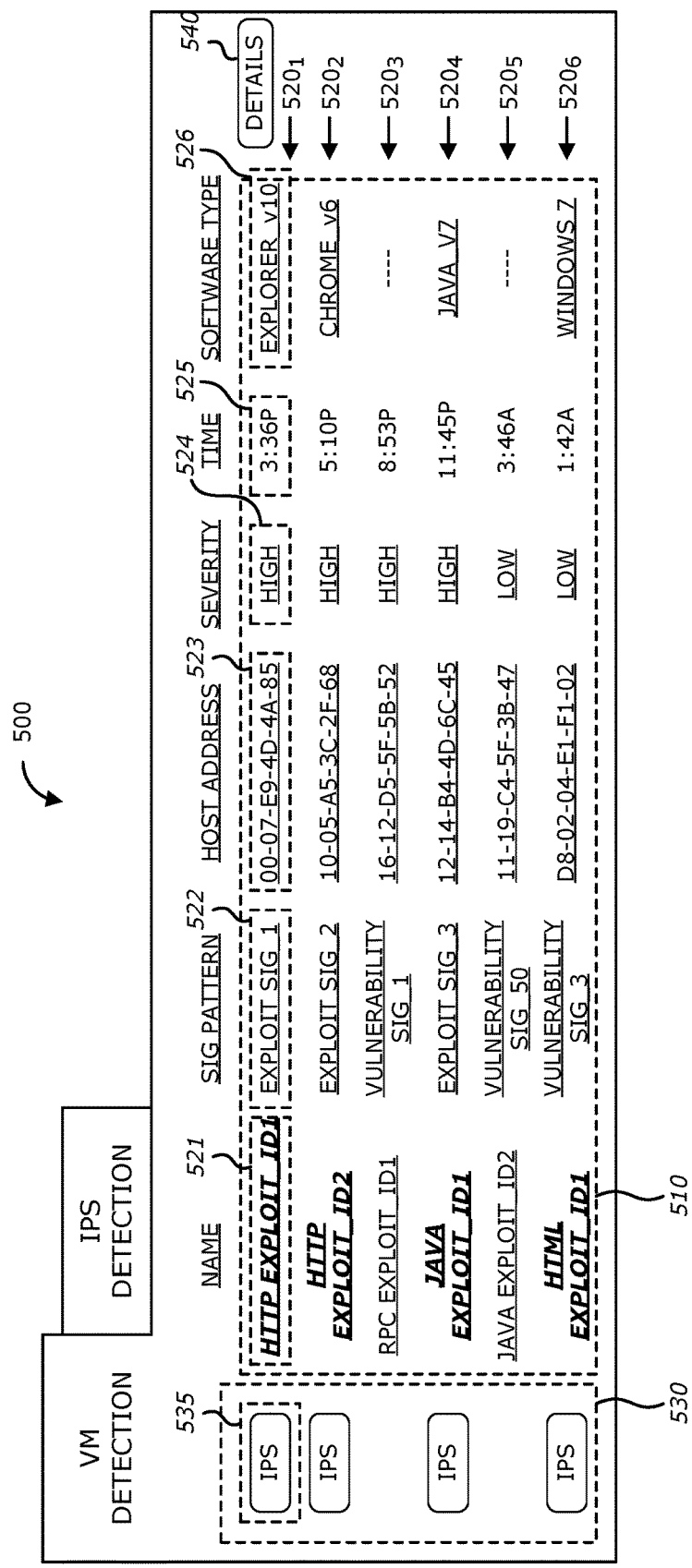
FIGS. 5A-5B are exemplary embodiments of user interface display screens produced by display logic, where the display screens provides an interactive dashboard.
Figure 5B:
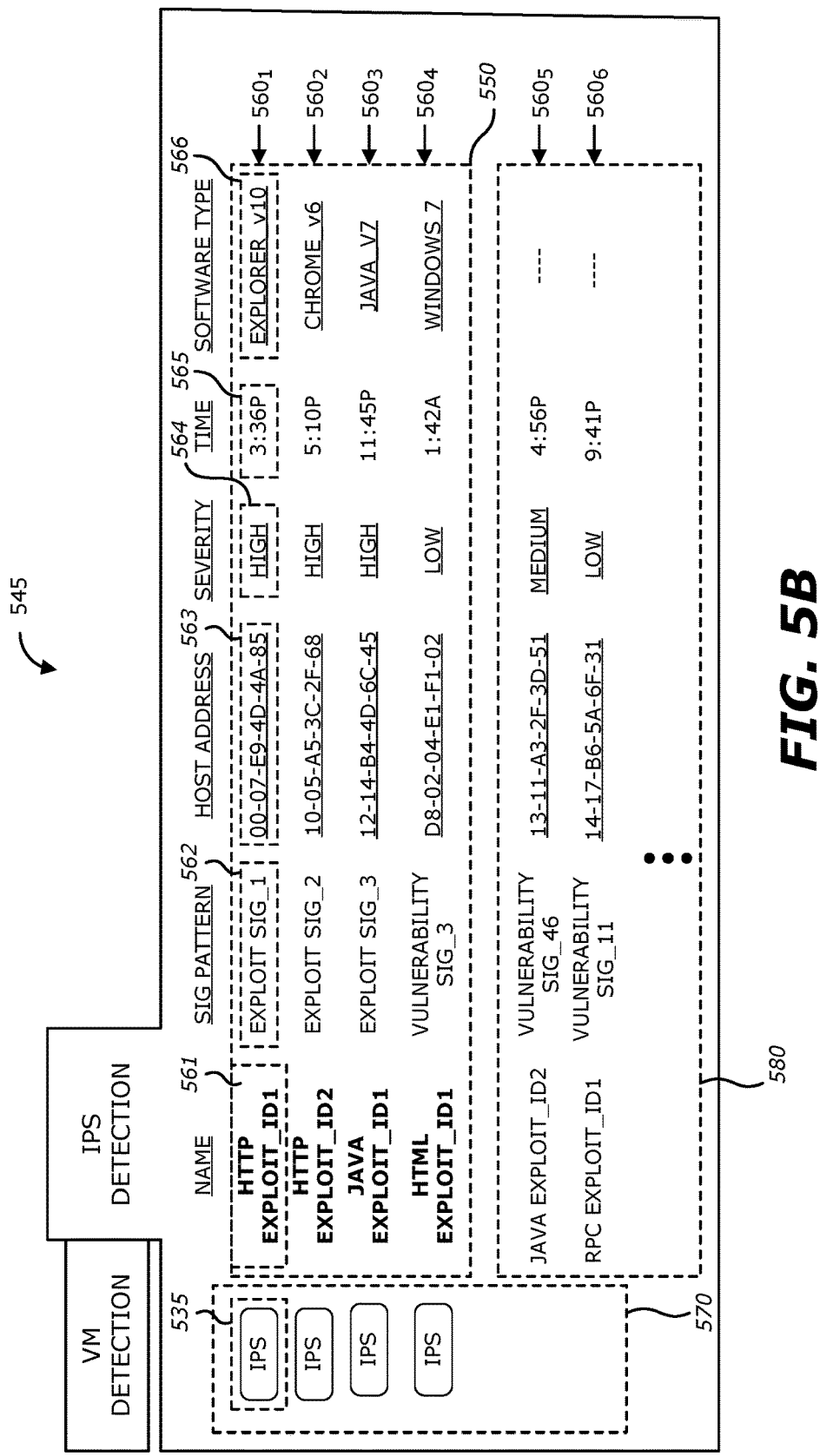

The display logic 290 also may be configured to recognize that the verified exploit information 195 is to be displayed more prominently than the non-verified exploit information 190. For instance, display logic 290 may be configured to prominently display the verified exploit information within different display screens, within different display windows, within a certain section of a display screen, or positioned at a top of a listing. Additionally or in the alternative, at least a portion of the verified exploit information for each verified exploit may be conveyed using a different font (e.g., color, size, type, style, and/or effects) than the font used for conveying exploit information associated with non-verified exploits. Additionally or in the alternative, one or more images may be placed proximate to exploit information associated with each verified exploit. illustrative examples of screen displays are shown in FIGS. 5A-5B.

Besides displaying the exploit information, the reporting logic 170 may issue an alert (e.g., by email or text message) to security administrators for example, communicating the urgency in handling one or more verified exploits. The reporting logic 170 may also issue alerts for one or more non-verified exploits by providing alerts in a manner that denotes to users a selected threat level.

As further shown, the IPS logic 120 may be communicatively coupled to a network 105 (e.g., public or private network) to receive incoming objects 110, such as one or more flows for example, destined for a particular client device. The IPS logic 120 is configured to conduct exploit signature checks and/or vulnerability signature checks on the incoming objects 110 to determine whether any of the objects 110 have characteristics indicative of an exploit, and thereafter, provide the suspect object(s) 130 to verification logic 150.

Figure 1B:
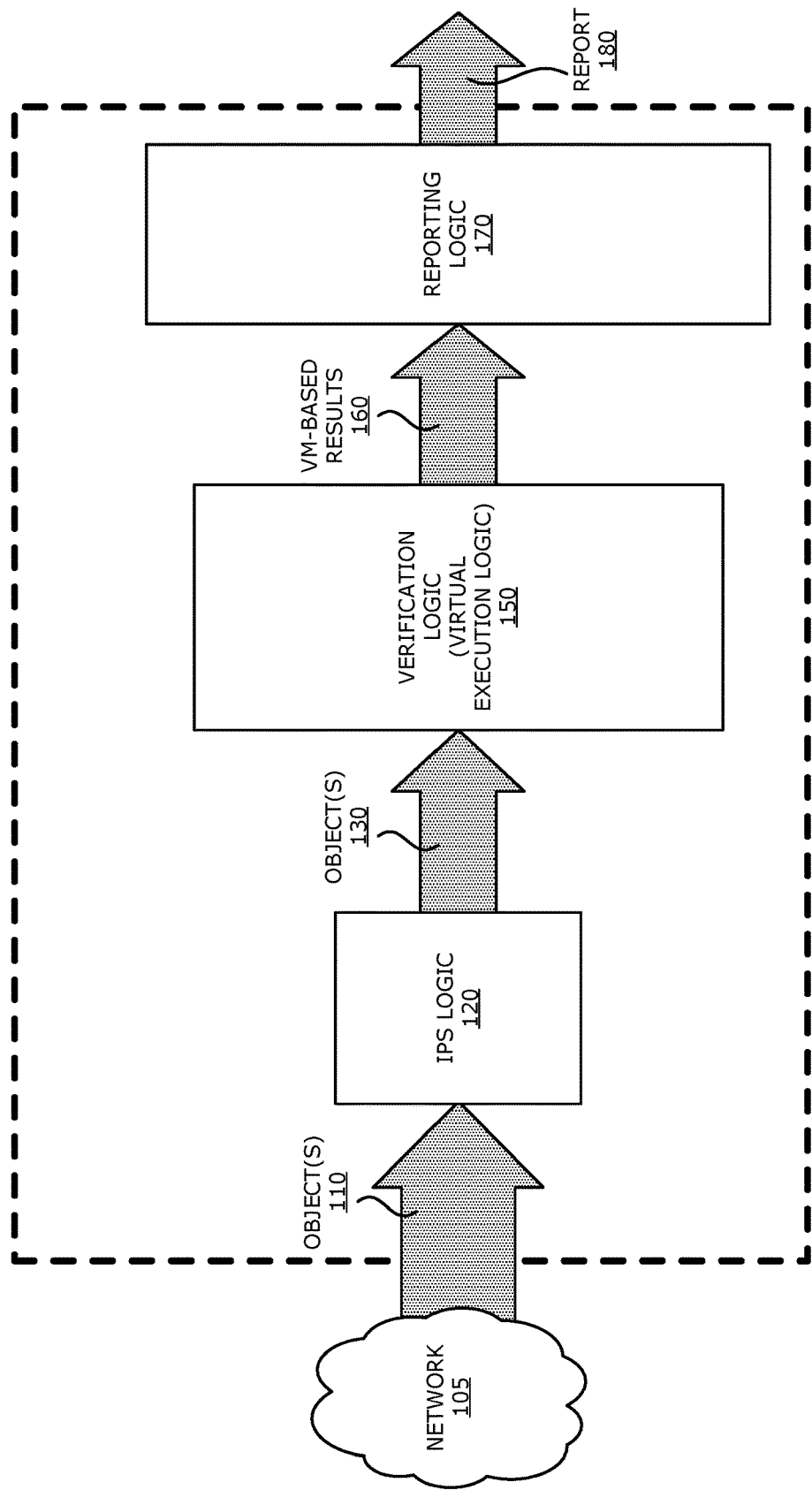
FIG. 1B is a second exemplary block diagram of an operational flow of threat detection and prevention within an electronic device.

According to one embodiment of the disclosure, the communicative coupling between the IPS logic 120 and the verification logic 150 is provided in a sideband configuration, where the suspect object(s) 130 (or a copy thereof) may be temporarily stored and processed in the verification logic 150 concurrently with analysis of other objects by the IPS logic 120. This allows for the detection of exploits through a longer duration of analysis by the verification logic 150 (e.g., longer processing and monitoring of processing of the suspect object 130 within the virtual execution logic). This also allows detection of exploits with delayed activation, including time-bombs. However, it is contemplated that the IPS logic 120 may be configured in-line with verification logic 150 as shown in FIG. 1B. Herein, the IPS logic 120 may provide both the suspect objects 130 and IPS-based results 140 to the verification logic 150, where the IPS-based results may be subsequently routed to reporting logic 170 from the verification logic 150.

B. General Architecture—First Embodiment

Referring to FIG. 2A, an exemplary block diagram of a communication system 200 deploying a plurality of threat detection and prevention (TDP) systems $210_1$-$210_N$ (N>1, e.g., N=3) communicatively coupled to a management system 220 via a network 225 is shown. In general, management system 220 is adapted to manage TDP systems $210_1$-$210_3$. For instance, management system 220 is responsible for automatically updating one or more exploit signatures and/or vulnerability signatures used by IPS logic within some or all of TDP systems $210_1$-$210_N$. Each of these signatures may represent a prior detected exploit or an uncovered software vulnerability. Such sharing may be conducted automatically or manually uploaded by an administrator. Also, such sharing may be conducted freely among the TDP systems $210_1$-$210_3$ or subject to a subscription basis.

Herein, according to the embodiment illustrated in FIG. 2A, a first TDP system $210_1$ is an electronic device that is adapted to analyze information associated with network traffic routed over a communication network 230 between at least one server device 232 and at least one client device 234. The communication network 230 may include a public network such as the Internet, in which case an optional firewall 236 (represented by dashed lines) may be interposed prior to accessing client device 234. Alternatively, the communication network 230 may be a private network such as a wireless data telecommunication network, wide area network, a type of local area network (LAN), or a combination of networks.

As shown, the first TDP system $210_1$ may be communicatively coupled with the communication network 230 via a network interface 238. In general, the network interface 238 operates as a data capturing device (sometimes referred to as a "tap" or "network tap") that is configured to receive data propagating to/from the client device 234 and provide at least some of this data to the first TDP system $210_1$. Alternatively, as shown in FIG. 2B, the first TDP system $210_1$ may be positioned behind the firewall 236 and in-line with client device 234.

According to one embodiment of the disclosure, the network interface 238 is capable of receiving and routing objects associated with network traffic to the first TDP system $210_1$. The network interface 238 may provide the entire object or certain content within the object, for example, one or more files that are part of a set of flows, packet payloads, or the like. In some embodiments, although not shown, network interface 238 may be contained within the first TDP system $210_1$.

According to an embodiment of the disclosure, the network interface 238 may be further configured to capture metadata from network traffic intended for client device 234. According to one embodiment, the metadata may be used, at least in part, to determine protocols, application types and other information that may be used by logic within the first TDP system $210_1$ to determine particular software profile(s). The software profile(s) are used for selecting and/or configuring a run-time environment in one or more virtual machines selected or configured as part of the dynamic analysis engine 270, as described below. However, according to another embodiment, a "matched" vulnerability signature may be used for VM configuration to specify software profile(s) (or corresponding software image(s)) having the specific vulnerability associated with the matched vulnerability signature. These software profile(s) may be directed to different versions of the same software application for fetching corresponding software image(s) from storage device 265.

It is contemplated that, for any embodiments where the first TDP system $210_1$ is implemented as an dedicated appliance or a dedicated computer system, the network interface 238 may include an assembly integrated into the appliance or computer system that includes a network interface card and related logic (not shown) for• connecting to the communication network 230 to non-disruptively "tap" network traffic propagating through firewall 236 and provide either a duplicate copy of at least a portion of the network traffic or at least a portion the network traffic itself to a static analysis engine 250. In other embodiments, the network interface 238 can be integrated into an intermediary device in the communication path (e.g., firewall 236, router, switch or other networked electronic device, which in some embodiments may be equipped with SPAN ports) or can be a standalone component, such as an appropriate commercially available network tap. In virtual environments, a virtual tap (vTAP) can be used to duplicate files from virtual networks.

As further shown in FIG. 2A, the first TDP system $210_1$ comprises the static analysis engine 250, a database 255, a scheduler 260, a storage device 265, a dynamic analysis engine 270, an optional classification logic 285, and a display logic 290. It is contemplated that the functionality of the classification logic 285 may be integrated into the display logic 290, where the display logic 290 would be configured with the prioritization logic 286 and/or the tag image generation logic 288.

In some embodiments, as shown in FIGS. 2A-2B, static analysis engine 250 may include one or more software modules that, when executed by one or more processors, performs multi-level static scanning on a particular object, namely exploit signature checks and/or vulnerability signature checks by IPS logic 120. Such signature check operations may involve accessing pre-stored signatures from one or more non-transitory storage mediums such as signature database 251. The static analysis engine 250 and the dynamic analysis engine 270 may be one or more software modules executed by the same processor or different processors, where these different processors may be located within the same processor package (e.g., different processor cores) and/or located at remote or even geographically remote locations that are communicatively coupled (e.g. by a dedicated communication link) or a network.

In general, referring to FIG. 2A, the static analysis engine 250 is communicatively coupled to receive one or more objects from network traffic which may be related or unrelated to each other. For instance, one object may be a series of HTTP packets operating as a flow routed over communication network 230. The static analysis engine 250 comprises IPS logic 120, where the IPS logic 120 analyzes each of the objects for known exploits using exploit signatures as well as for the protocol activity using vulnerability signatures. For instance, the exploit matching logic 252 within the IPS logic 120 performs exploit signature checks, which may involve a comparison of one or more pre-stored exploit signatures (pre-configured and predetermined attack patterns against the suspect object) from signature database 251. Similarly, the signature matching logic 253 within the IPS logic 120 performs vulnerability signature checks, which may involve a process of uncovering deviations in messaging practices set forth in applicable communication protocols (e.g., HTTP, TCP, etc.). As an illustrative example, HTTP messages may be analyzed to determine compliance with certain message formats established for the protocol (e.g., out-of-order commands). Furthermore, payload parameters of the HTTP messages may be analyzed to determine further compliance.

Upon detecting a match during the exploit signature check and/or the vulnerability signature check (an object under analysis has characteristics that suggest the object is an exploit), the IPS logic may be adapted to upload the IPS-based results 140 for storage in database 255. These results 140 may include, but are not limited or restricted to (i) an exploit identifier such as a particular name/family of the suspected exploit (if known); (ii) source address (e.g., Uniform Resource Locator "URL", Internet Protocol "IP" address. etc.) of a source of the suspect object; (iii) time of analysis; (iv) information associated with anticipated anomalous activities that may be conducted by the suspect exploit; (v) information regarding anticipated communication deviations from the protocol applicable to the network traffic; and/or (vi) recommended remediation techniques. The IPS-based results 140 may be accessible by classification logic 285 and/or display logic 290, as described below.

Furthermore, the IPS logic 120 routes suspect object to the virtual execution logic 150 within dynamic analysis engine 270. The dynamic analysis engine 270 is configured to provide more in-depth analysis of suspect object(s) from the IPS logic 120 by analyzing the content of the suspect object(s) in order to verify whether or not the suspect object is an exploit. Additionally, according to one embodiment of the disclosure, a tag value may accompany or be associated with the suspect object for use in subsequently locating the suspect object's corresponding stored IPS-based results 140 after virtual processing within the dynamic analysis engine 270. For instance, the tag value may be an address, an index number, or the like. It is contemplated that tag value may be separate from the suspect object or may be strategically placed within the suspect object itself (e.g., within a header portion, payload, etc.).

More specifically, after static scanning has been completed, the IPS logic 120 provides the suspect object to the dynamic analysis engine 270 for in-depth dynamic analysis using virtual machines (VMs) $275_1$-$275_M$ (M>1). For instance. the dynamic analysis engine 270 may simulate transmission and/or receipt by a destination device comprising the virtual machine. Of course, if the object is not suspected of being an exploit, the IPS logic 120 may simply store the IPS-based results within database 255 and denote that the object is benign.

According to one embodiment, one or more VMs $275_1$-$275_m$ within the virtual execution environment 272 may be configured based on the results of the exploit signature check and the vulnerability signature check conducted by the IPS logic 120. For instance, for an unknown vulnerability, the VMs $275_1$-$275_M$ may be configured with all of the software profiles corresponding to the software images stored within storage device 265. Alternatively, the VMs $275_1$-$275_M$ may be configured according to a prevalent software configuration, software configuration used by an electronic device within a particular enterprise network (e.g., client device 234), or an environment that is required for the object to be processed, including software such as a web browser application, PDF1'm reader application, or the like. However, for a known vulnerability which occurs after a successful match during a vulnerability signature check, the VMs $275_1$-$275_M$ may be more narrowly configured to software profiles associated with vulnerable software.

As a first illustrative example, upon determining that the suspect object matches a particular vulnerability signature, the scheduler 260 may determine (1) what vulnerability signature has been tagged; (2) if the vulnerability is a server side vulnerability or client side vulnerability; and/or (3) which software image(s) are associated with software having the vulnerability associated with the tagged vulnerability signature. Thereafter, the software profile(s) are selected by the scheduler 260 to fetch these software image(s) for configuration of VM $275_1$. This tailored selection scheme avoids VM configuration for software that does not feature the matched (tagged) software vulnerability.

As a second illustrative example, the scheduler 260 may be adapted to configure the multiple VMs $275_1$-$275_M$ for concurrent virtual execution of a variety of different versions of the software in efforts to verify that the suspect object identified by the signature matching logic 253 is an exploit.

Of course, it is contemplated that the VM configuration described above may be handled by logic other than the scheduler 260. For instance, although not shown, the static analysis engine 250 may include configuration logic that is adapted to determine (1) what vulnerability signature was tagged; (2) if the vulnerability is a server side vulnerability or client side vulnerability; and/or (3) which software image (s) are associated with software having the vulnerability associated with the tagged vulnerability signature. This configuration logic may transmit the VM configuration information to the scheduler 260 and/or dynamic analysis engine 270 to handle VM configuration as described above.

According to one embodiment of the disclosure, the dynamic analysis engine 270 is adapted to execute one or more VMs $275_1$-$275_M$ to simulate the receipt and execution of content associated with an object under analysis within a run-time environment as expected by the type of object. For instance, dynamic analysis engine 270 may optionally include a protocol sequence replayer (replay logic) 280 to replay the suspect object and provide replayed data flows to the VM(s) $275_1$, . . . , and/or $275_M$ or object extractor logic 282 to extract a self-contained object within a data flow for virtual processing by VM(s) $275_1$, . . . and/or $275_M$. One embodiment of the protocol sequence replayer is described in U.S. Pat. No. 8,375,444, the entire contents of which are incorporated by reference herein.

For example, the replay logic 280 may be adapted to provide, and sometimes modify (e.g. modify IP address, etc.) packets associated with the suspect objects and synchronize any return network traffic generated by the virtual execution environment 272 in response to the packets. Hence, the replay logic 280 may suppress (e.g., discard) the return network traffic such that the return network traffic is not transmitted to the communication network 230. According to one embodiment of the disclosure, for a particular suspect object being a flow such as a TCP or UDP sequence, the replay logic 280 may replay the data packets by sending packets to the virtual execution environment 272 via a TCP connection or UDP session. Furthermore, the protocol sequence replay logic 280 synchronizes return network traffic by terminating the TCP connection or UDP session.

As further shown in FIG. 2A, the monitoring logic 276 within the dynamic analysis engine 270 may be configured to monitor behavior of the content being analyzed by one or more VMs $275_1$, . . . , and/or $275_M$, for detecting anomalous or unexpected activity indicative of an exploit. If so, the content may be determined as being associated with malicious activity, and thereafter, monitoring logic 276 operating with a score determination logic 278 may route the VM-based results 160 (e.g., computed score, information associated with the detected anomalous behaviors, and other information associated with the detected malicious activity by the suspect object) to classification logic 285 and/or database 255. It is noted that the tag value, if used, may be provided as part of the VM-based results 160.

According to one embodiment of the disclosure, the score determination logic 278 comprises one or more software modules that are used to determine a probability (or level of confidence) that the suspect object is an exploit. Score determination logic 278 is configured to generate a value (referred to as a "score") that classifies the threat of the possible exploit. Of course, a score may be assigned to the suspect object as a whole by mathematically combining the scores determined by analysis of different content associated with the same suspect object to obtain an overall score for that suspect object. Thereafter, the suspect object and/or score are routed to classification logic 285 for use in prioritization.

In general, the classification logic 285 may be configured to receive the VM-based results 160. According to one embodiment of the disclosure, the score may be used, at least in part, to determine whether the virtual execution logic 150 has verified that the suspect object is an exploit. Where the score represents that the suspect object 130 has not been verified by the virtual execution logic 150 to have the characteristics of an exploit, some or all of the VM-based results 160 may be combined with its corresponding IPS-based results to produce the non-verified exploit information 190, which is stored in database 255.

However, if the score represents that the suspect object 130 has been verified by the virtual execution logic 150 as an exploit, at least some of the combined IPS-based results 140 and/or the VM-based results 160 may be modified by the classification logic 285 and subsequently stored as at least part of the verified exploit information 195. Stated differently, the classification logic 285 operating with the database 255 may be responsible for prioritizing the display of exploit information associated with the verified exploits. This may involve the classification logic 285 modifying order or position for the displayed verified exploit information, or adding information to the verified exploit information that is used by the display logic 290 to modify display order or positioning; modifying the type of font (e.g., color, size. type, style, and/or effects) used for text conveying certain verified exploit information: placing one or more images proximate to verified exploit information for each verified exploit; or the like.

Of course, it is contemplated that other parameters, combined with or separate from the score, may be used or relied upon to determine whether and/or how to highlight display of the exploit information associated with the suspect object.

Thereafter, along with non-verified exploit information 190, the verified exploit information 195 is stored within database 255 and accessible by display logic 290.

More specifically, according, to one embodiment of the disclosure, classification logic 285 comprises prioritization logic 286 and tag image generation logic 288. According to one embodiment of the disclosure, the prioritization logic 286 may be adapted to modify (e.g., alter or associate display commands to) exploit information associated with verified exploits based one or more factors, including (i) score associated with the object; (ii) source of the object; (iii) repeated detection of the same exploit in different suspect objects; or the like. This modification may involve modifying font (e.g., color, size, type, style, and/or effects) used to convey the exploit information associated with verified exploits. As another example, this modification may involve classification and storage of the exploit information as verified exploit information 195 which, when accessed by the display logic 290, places the exploit information associated with the verified exploit at a specific location on a display screen or within display image (e.g., within a specific window or display screen listing the verified exploits, at a particular order within the listing of the verified and non-verified exploits, etc.).

Of course, as an alternative, the display logic 290 may be implemented with some or all of the functionality associated with the prioritization logic 286 and/or tag image generation logic 288 in lieu of deployment within the classification logic 285. Hence, responsive to information received from the classification logic, the display logic 290 may be adapted to modify exploit information associated with verified exploits.

The tag image generation logic 288 may be adapted to operate in combination with the prioritization logic 286 to generate a tag image (not shown), which is included as part of the verified exploit information 195 associated with suspect object for display. The tag image is used to provide another visual representation of the presence of a verified exploit, namely a suspected exploit detected by the IPS logic 120 whose presence has been verified by the virtual execution logic 150.

Of course, in lieu of or in addition to static scanning operations being conducted by TDP systems $210_1$-$210_3$, it is contemplated that cloud computing services 240 may be implemented with IPS logic 120 to perform the exploit and/or vulnerability signature checks and/or with virtual execution logic 150 to conduct virtual execution on content within the object under analysis, as described herein. The display logic 290 may cause the display of the exploit information associated with the verified exploits and/or non-verified exploits graphically or otherwise through a downloaded page or pages from the cloud computing services 240 to a client device or to an application running on a client device that displays the results obtained from the cloud computing services 240. In accordance with this embodiment, TDP system $210_1$ may be adapted to establish secured communications with cloud computing services 240 for exchanging information.

C. General Architecture—Second Embodiment

Referring now to FIG. 2B, first TDP system $210_1$ may be coupled with the communication network 230 in line with client device 234. Contrary to the embodiment illustrated in FIG. 2A, first TDP system $210_1$ comprises an interface unit 295 that directs signaling on communication network 230 to static analysis engine 250 or classification logic 285, given that the dynamic analysis engine 270 is deployed in cloud computing services 240. Hence, objects from network traffic for static analysis are routed to static analysis engine 250 via communication path 296. The suspicious objects may be routed via path 297 to the dynamic analysis engine 270 in cloud computing services 240. Similarly, objects that are not determined to be at least "suspect" may be returned via path 297 for continued routing to client device 234. The results of the dynamic analysis engine 270 (e.g., exploit information) may be routed via path 298 for prioritization and tagging before storage within database 255 for subsequent use by display logic 290.

D. Exemplary Logic Layout of TDP System

Figure 3:
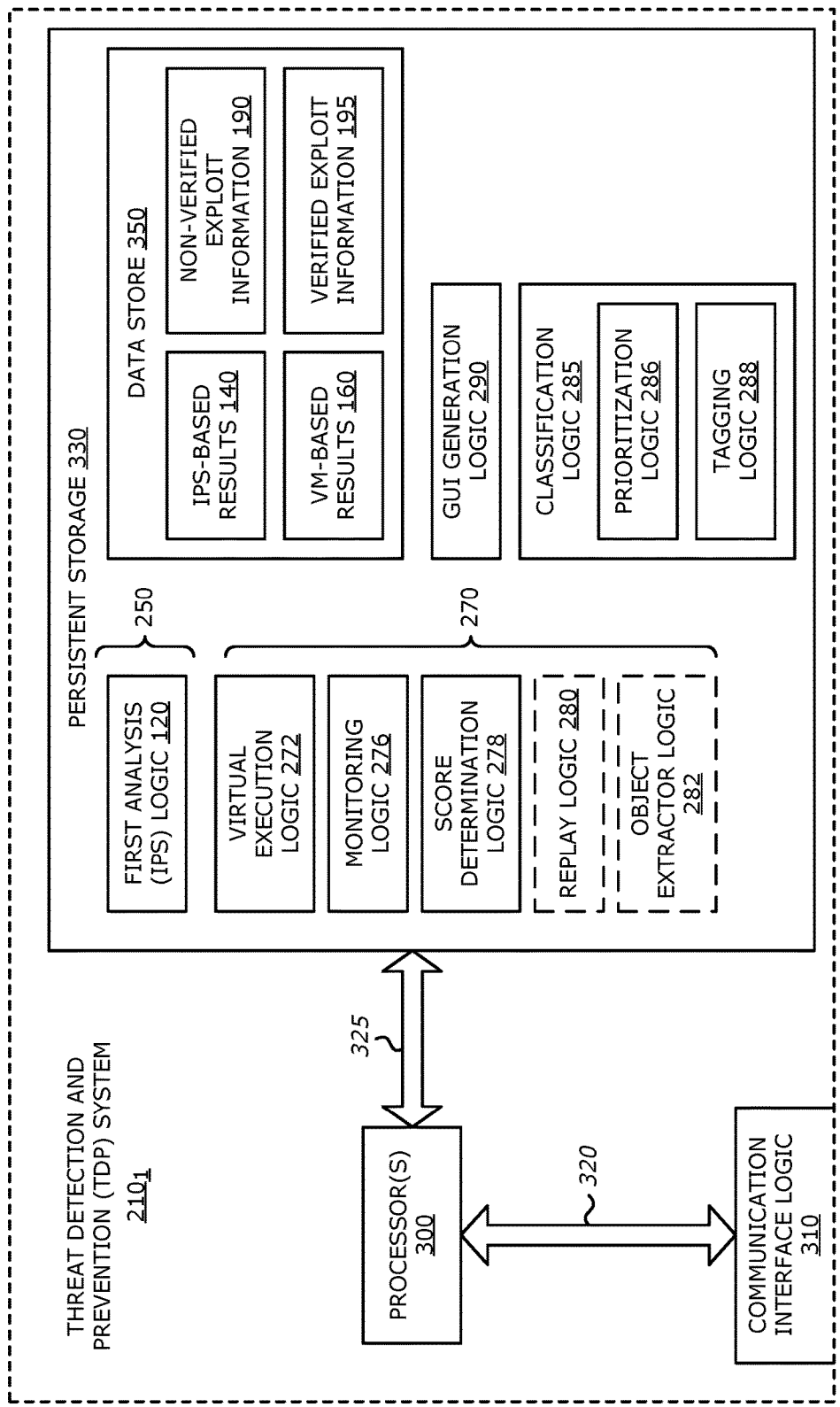
FIG. 3 is an exemplary block diagram of logic associated with the TDP system of FIGS. 2A-2B.

Referring now to FIG. 3, an exemplary block diagram of logic associated with TDP system $210_1$ of FIGS. 2A-2B is shown. TDP system $210_1$ comprises one or more processors 300 that are coupled to communication interface logic 310 via a first transmission medium 320. Communication interface logic 310 enables communications with other TDP systems $210_1$-$210_3$ and management system 220 of FIG. 2A-2B. According to one embodiment of the disclosure, communication interface logic 310 may be implemented as a physical interface including one or more ports for wired connectors.

Additionally, or in the alternative, communication interface logic 310 may be implemented with one or more radio units for supporting wireless communications with other electronic devices.

Processor(s) 300 is further coupled to persistent storage 330 via transmission medium 325. According to one embodiment of the disclosure, persistent storage 330 may include (i) static analysis engine 250. including first analysis logic (e.g., IPS logic) 250; (ii) the dynamic analysis engine 270. including virtual execution logic 272, monitoring logic 276, score determination logic 278 along with optional replay and object extractor logic 280 and 282; (iii) classification logic 285 including prioritization logic 286 and tag image generation logic 288; and (iv) display logic 290. Of course, when implemented as hardware, one or more of these logic units could be implemented separately from each other.

IPS logic 120 comprises one or more software modules that conduct a first static analysis on each incoming object. As described above, this analysis may involve performing at least exploit signature checks and vulnerability signature checks on each incoming object to determine whether characteristics of any of these objects are indicative of an exploit. If not, the analysis may be discontinued for the object, or the object may be provided for non-real time forensic review. Upon confirming that one or more suspect objects have characteristics of an exploit, the IPS logic 120 provides the suspect object(s) to the virtual execution logic 150. It is contemplated that a tag value, if used, may accompany (or be associated with) the suspect object to identify a stored location of the IPS-based results 140 for the suspect object, as described above. The IPS-based results 140 are uploaded to data store 350, at least partially operating as a database, for subsequent access by classification logic 285.

Virtual execution environment 272 comprises one or more software modules that are used for performing an in-depth, dynamic and real-time analysis of the suspect object using one or more VMs. More specifically, the virtual execution environment 272, protocol sequence replay logic 280 and/or object extractor logic 282 are adapted to run the VM(s), which virtually processes the content associated with the suspect objects by simulating receipt and execution of such content in order to determine the presence of one or more exploits. Furthermore, the monitoring logic 276 monitors in real-time and may also log at least anomalous behaviors by the VM(s) configured with certain software and features that are presumably targeted by the matched exploit or vulnerability. In essence, the monitoring logic 276 identifies the effects that the suspect object would have had on a physical electronic device with the same software/feature configuration. Such effects may include unusual network transmissions, unusual changes in performance, and the like.

Thereafter, according to the observed behavior of the virtually executed content, the monitoring logic 276 may determine that the content is associated with one or more exploits, where the severity of the observed anomalous behavior and/or the likelihood of the anomalous behavior results from an exploit, is evaluated and reflected in a "score" assigned by the score determination logic 278. As a result, these logic units collectively output the VM-based results 160 for use by classification logic 285 to highlight exploit information associated with verified exploits.

The prioritization logic 286 comprises one or more software modules that are used to highlight information associated with verified exploits, namely the verified exploit information 195. For instance, the prioritization logic 286 may assign higher priority to exploit information directed to verified exploits, where the priority may be used by the display logic 290 to determine an order or location for display. Furthermore, the prioritization logic 286 may be adapted to modify the font used in display of the verified exploit information (e.g., color, size, type, style, and/or effects), or control the placement of one or more images provided by the tag image generation logic 288 proximate to its corresponding exploit information.

Continuing the above example, processor(s) 300 may invoke display logic 290, which produces one or more screen displays for conveying a detailed summary of verified and/or non-verified exploits detected by the TDP system $210_1$. According to one embodiment of the disclosure, the information associated with the verified exploits (verified exploit information 195) may be presented in a first area of a display screen while information associated with the non-verified exploits (non-verified exploit information 190) may be presented in a second area of the display screen. As another example, the verified exploit information 195 may be presented as top entries in a listing of all exploits detected by the IPS logic while the non-verified exploit information 190 is presented subsequently. As another example, some or all of the verified exploit information 195 may be presented in different font (e.g., different type, color, style such as bold or italic, effects such as underlining or shadow, etc.) than font used for conveying the non-verified exploit information 190. As yet another example, a tag image may be positioned next to the verified exploit information 195 unlike non-verified exploit information 190 associated with suspect objects.

E. Display and Prioritization of Detected Exploits

Figure 4:
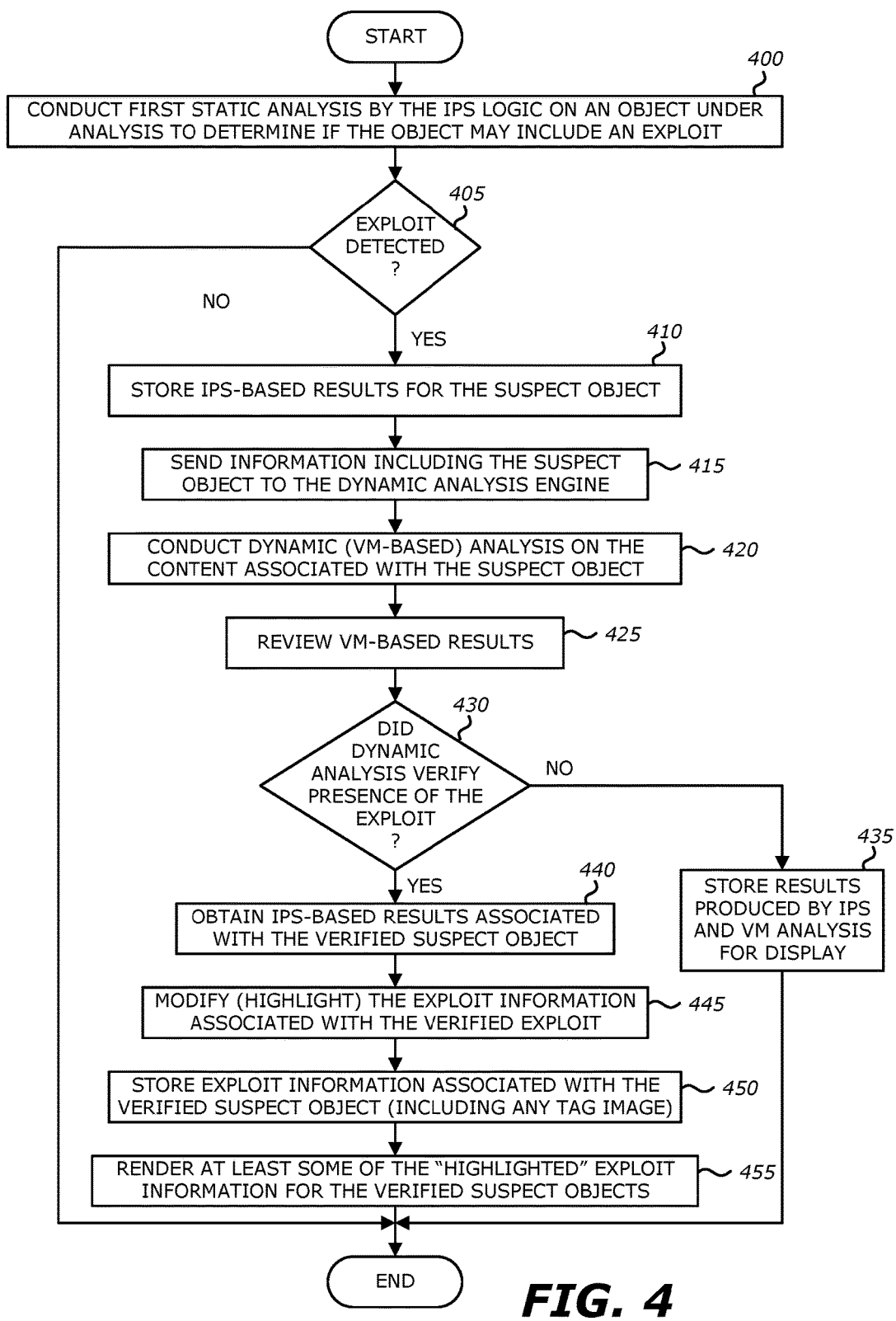
FIG. 4 is an exemplary diagram of a flowchart illustrating operations of the threat detection and prevention process.

Referring to FIG. 4, an exemplary diagram of a flowchart illustrating a threat detection and prevention process which generates a report that highlights information associated with suspected exploits detected by the IPS logic and verified by the virtual execution environment is shown. Upon receipt of an object. the TDP system conducts a first static analysis operation on the object (block 400). Herein, the first static analysis operation may include exploit signature checks and/or vulnerability signature checks by the IPS logic to determine whether characteristics of an object under analysis are indicative of an exploit. Upon determining that the suspect object may have the characteristics of one or more suspected exploits, the object is tagged for VM-based analysis and information associated with the suspect object and/or potential exploit (IPS-based results) is stored for subsequent access (blocks 405 and 410).

Although not shown, when determining that the suspect object has characteristics of a suspected exploit, the IPS logic may be configured to block the object from proceeding to the targeted client device, although blocking may be delayed until completion of the VM-based analysis to mitigates errors due to false positives. This blocking functionality may be adjusted by the network administrator based on the severity/type of suspected exploit, number of occurrences of this type of exploit within a prescribed time period, or the like. Furthermore, prior to performing further exploit analysis, if used, a tag value may accompany (or being associated with) the suspect object when output from the IPS logic so that the IPS-based results for the suspect object can be related to the subsequent VM-based results for that object.

After IPS-based analysis for the suspect object has concluded, the content of the suspect object may undergo VM-based analysis (blocks 415 and 420). The results of the VM-based analysis (VM-based results) are provided for subsequent review (block 425). According to one embodiment of the disclosure, the classification logic performs such review, although in the alternative, logic within the dynamic analysis engine may conduct this review.

Normally, if the VM-based analysis fails to verify that the suspect object is an exploit, a score may be assigned to denote that no exploit has been detected (block 430). In this case, information produced during the VM analysis of the suspect object along with its corresponding IPS-based results are stored as part of the non-verified exploit information (block 435). However, during virtual execution of the object, if the monitored behavior denotes that the suspect object is an exploit, a score is assigned that represents the likelihood and/or threat level for the "verified" exploit(s).

According to one embodiment of the disclosure, the classification logic may be configured to obtain the IPS-based results associated with the verified exploit, where some or all of the information from the IPS-based results and the VM-based results may be prominently displayed (highlighted) as illustrated in blocks 440 and 445. Such highlighting may include (i) assigning a specific display location for exploit information associated with verified exploits that is different from exploit information associated with non-verified exploits; (ii) modifying the presentation (e.g., font type, color, style, etc.) of exploit information associated with verified exploits where the exploit information associated with the non-verified exploits will have a different presentation; (iii) controlling placement of one or more images proximate to exploit information associated with verified suspect objects only. Other display adjustments may be used, as this highlighting is conducted to visibly differentiate exploit information associated with the verified exploits from exploit information associated with the non-verified exploits.

Thereafter, the (highlighted) verified exploit information is uploaded into the database for storage and now accessible by display logic for rendering (blocks 450 and 455).

F. Display Screens of Detected Malicious Objects

Referring now to FIG. 5A, an exemplary embodiment of a first user interface display screen 500 produced by the display logic of FIGS. 2A-28 that provides an interactive dashboard is shown. Herein, rendered by the display logic, the display screen 500 comprises a plurality of display areas 510 and 530 that illustrate information directed to exploits uncovered over a selected time period by the TDP system. It is noted that multiple highlighting techniques are shown in display screens 500 and 545, although it is contemplated that any one or more highlighting technique may be conducted for a particular display.

More specifically, according to one embodiment of the disclosure, a first area 510 displays a plurality of entries $520_1$-$520_R$ (R>1, R=6 for this embodiment) that provide information directed verified exploits and/or non-verified exploits. As shown, each row of entries (e.g., $520_1$) rendered by the display logic comprises a plurality of fields, including one or more of the following: (1) a name 521 of the exploit associated with a suspect object; (2) a signature pattern 522 applicable to the object under analysis; (3) addressing information 523 (e.g., Internet Protocol "IP" address, Media Access Control "MAC" address, etc.) for a source device providing the verified or non-verified exploit; (4) a level of severity 524 (e.g., high, medium, low) of the detected exploit, where the severity level corresponds, at least in part, to the threat score; (5) a time 525 during which the exploit analysis process was conducted; and/or (6) name and/or version number 526 of software detected to be vulnerable to the detected exploit.

A second area 530 may be configured with one or more images corresponding to each entry for a verified exploit, namely an object initially identified by the IPS logic as having characteristics indicative of an exploit and verified of being an exploit by the virtual execution logic. For instance, as illustrated in FIG. 5A, image 535 is displayed proximate to information associated with a corresponding verified exploit named "HTTP Exploit_ID1." Similar images are illustrated for verified exploit information associated with verified exploits named "HTTP Exploit_ID2," "Java Exploit_ID1," and "HTML Exploit_ID1."

It is noted that the mere existence of a verified exploit may warrant heightened severity level, but does not require heightened severity levels as illustrated by the fact that certain non-verified exploits may be assigned higher severity levels than some verified exploits. Rather. exploit information associated with the verified exploits is highlighted, namely this exploit information is displayed more prominently than exploit information associated with non-verified exploits for example. This allows a network administrator to more quickly and easily determine verified exploits and thereby substantially mitigate administrative and operational disadvantages from false-positives.

As an example, as a highlighting technique, the font associated with the exploit names (HTTP Exploit_ID1; HTTP Exploit_ID2; Java Exploit_ID1; and HTML Exploit_ID1) may be displayed differently than the font associated with the exploit names for non-verified exploits (e.g., Java Exploit_ID2). Alternatively, the verified exploit information associated with the verified exploits may be ordered at the top of the listing (see FIG. 5B). Also, a single display screen may produce two areas, where a first area includes exploit information associated with verified exploits while a second area includes exploit information associated with non-verified exploits (see FIG. 5B).

Furthermore, although not shown, it is contemplated that selection of a portion of the entry (e.g., entries within fields 521/522/523/524/526 (as represented by an underlined portion) and/or a separate "Details" field 540) may enable the network administrator to obtain more detailed information of the exploit and/or analysis associated with that exploit.

For instance, by selecting the particular listed exploit 521, the administrator may be able to uncover family and other information related to the exploit (e.g., documented attacks, recommended remediation techniques, targeted client device (s), etc.). Also, by selecting the signature 522, the administrator may have access to additional information concerning what signature (exploit, vulnerability, etc.) was determined by the IPS to match the suspect object. Additional information (e.g., information on signature updates, detection history of this signature with other objects, etc.) may be provided as well.

Similarly, by selecting the corresponding host address 523 or the severity level 524, the administrator may be provided with additional information directed to geographic location of the source of the suspect object corresponding to that exploit, addressing information directed to intermediary devices that received the suspect object, the particular network operations targeted by the exploit, or the like. Also, by selecting the software type 526, a listing of all software types detected to be vulnerable to the verified exploit (along with video/images of monitored anomalous behaviors denoting the presence of such exploit) may be accessed.

Referring now to FIG. 5B, an exemplary embodiment of a second user interface display screen 545 produced by the display logic of FIGS. 2A-2B that provides an interactive dashboard is shown. Herein, the display screen 545 comprises a plurality of areas 550, 570 and 580 that display results of IPS detection analysis over a selected time period.

As shown, similar to the first user interface display screen 500, first area 550 of the second user interface display screen 545 displays a plurality of entries 5601-560$s$ (S>1, S=4 for this embodiment) that provides information directed to verified exploits. Each of the entries (e.g., 5601) rendered by the display logic comprises: (1) a name 561 of the verified exploit (suspect object verified to be an exploit); (2) a signature 562 that initially identified the suspect object as having characteristics indicative of an exploit; (3) addressing information 563 (e.g., Internet Protocol "IP" address, Media Access Control "MAC" address, etc.) for a source device providing the detected exploit; (4) a level of severity 564 (e.g., high, medium, low) of the detected exploit that corresponds, at least in part, to the threat score; (5) a time 565 during which the exploit analysis process was conducted; and/or (6) name and/or version number 566 of software detected to be vulnerable to the detected exploit.

As shown, a second area 570 may be provided, which comprises an image corresponding to each entry that is associated with the verified exploits, as described above. As illustrated in FIG. 5B, image 535 is displayed with information associated with a corresponding verified exploit named "HTTP Exploit_ID1." Similar images are illustrated as highlighted verified exploit information for verified exploits named "HTTP Exploit_ID2," "Java Exploit_ID1," and "HTML Exploit_ID1."

A third area 580 illustrates exploit information associated with non-verified exploits named "Java Exploit_1D2", "RPC Exploit_ID1" for example.

III. Alternative Embodiment—IPS Logic & Secondary Analysis Logic with Virtual Execution Logic Verification According to an alternative embodiment of the disclosure, the static analysis engine may be configured with a first static analysis logic (e.g., IPS logic) and a second static analysis logic (e.g., heuristic logic), which is configured to operate independently from the IPS logic and identifies whether characteristics of any of the incoming objects are indicative of an exploit. As described below, the first static analysis logic and the second static analysis logic may operate in parallel or in tandem.

In particular, as described above, the first static analysis logic (IPS logic) conducts at least exploit signature checks and/or vulnerability signature checks on the incoming objects to identify a first subset of objects having characteristics indicative of an exploit. The second static analysis logic (heuristic logic) may be configured to analyze the same or different objects, where such analysis may be in accordance with at least a set of rules and/or signatures different than those utilized by the first static analysis logic (IPS logic).

More specifically, according to this embodiment of the invention, upon identifying the suspect objects (fast subset of objects), the first static analysis logic (IPS logic) provides suspect objects, perhaps each accompanied by or associated with a tag identifier (hereinafter referred to as "tag_1D1"), to the verification logic 150 of FIGS. 6A-6B. Tag_ID1 may be used to indicate to other logic that the suspect object originated from the first static analysis logic (IPS logic).

The second static analysis logic (heuristic logic) is configured to analyze the incoming objects to determine whether the presence, absence or modification of information within an object may denote potential malicious activity indicating that object may be an exploit. Such determination may involve the second static analysis logic (heuristic logic) conducting operations to determine whether certain portions of the object corresponds to one or more "malicious identifiers," which may include, but are not limited or restricted to a particular source or destination address (e.g., URLs, IP addresses, MAC addresses, etc.) that is associated with known exploits; exploit patterns; or shell code patterns.

Additionally, with each suspect object, the heuristic logic may provide a tag identifier (tag_ID2) for use in locating corresponding heuristic-based results 640 associated with each suspect object 630. Hence, to LD2 may be further used to identify to other logic that this suspect object originated from the heuristic logic 620.

After either the first static analysis logic (IPS logic) or the second static analysis logic determine which of the incoming objects have characteristics indicative of an exploit, the suspect objects are provided to the virtual execution logic for more in-depth dynamic analysis using one or more virtual machines (VMs). Such dynamic analysis may include virtual execution of the content of the suspect objects with one or more configured VMs, as described above. The behaviors of the VM(s) are monitored for detection of anomalous or unexpected activity.

It is contemplated that the first static analysis logic (IPS logic) and the second static analysis logic (heuristic logic) may operate in parallel in which both of these logic units conduct the preliminary exploit detection analysis on the same suspect objects. More specifically, the second static analysis logic (heuristic logic) may conduct its analysis on an object extracted from the network traffic concurrently (i.e., at least partially overlapping in time) with the analysis of the same object by the IPS logic. This provides the TDP system with an ability to account for false negatives that signify a lack of detection of an exploit by the IPS logic. Also, such parallel analysis may be conducted in order to increase scrutiny of network traffic for objects originating from a certain geographic location prone to exploits, from a certain IP addresses that have been identified as a malicious source, or the like.

Of course, it is contemplated that the first static analysis logic (IPS logic) and second static analysis logic (heuristic logic) may operate in tandem in which an incoming object is capable of being processed by either the IPS logic or the heuristic logic within the embodiment. Control of the selection as to whether the static analysis is performed by the first static analysis logic (IPS logic) or the second static analysis logic (heuristic logic) may be assigned to additional control logic within the static analysis engine. Such control may be based on the type of object under analysis, source, traffic conditions, or the like.

A. General Communication Flow

Figure 6A:
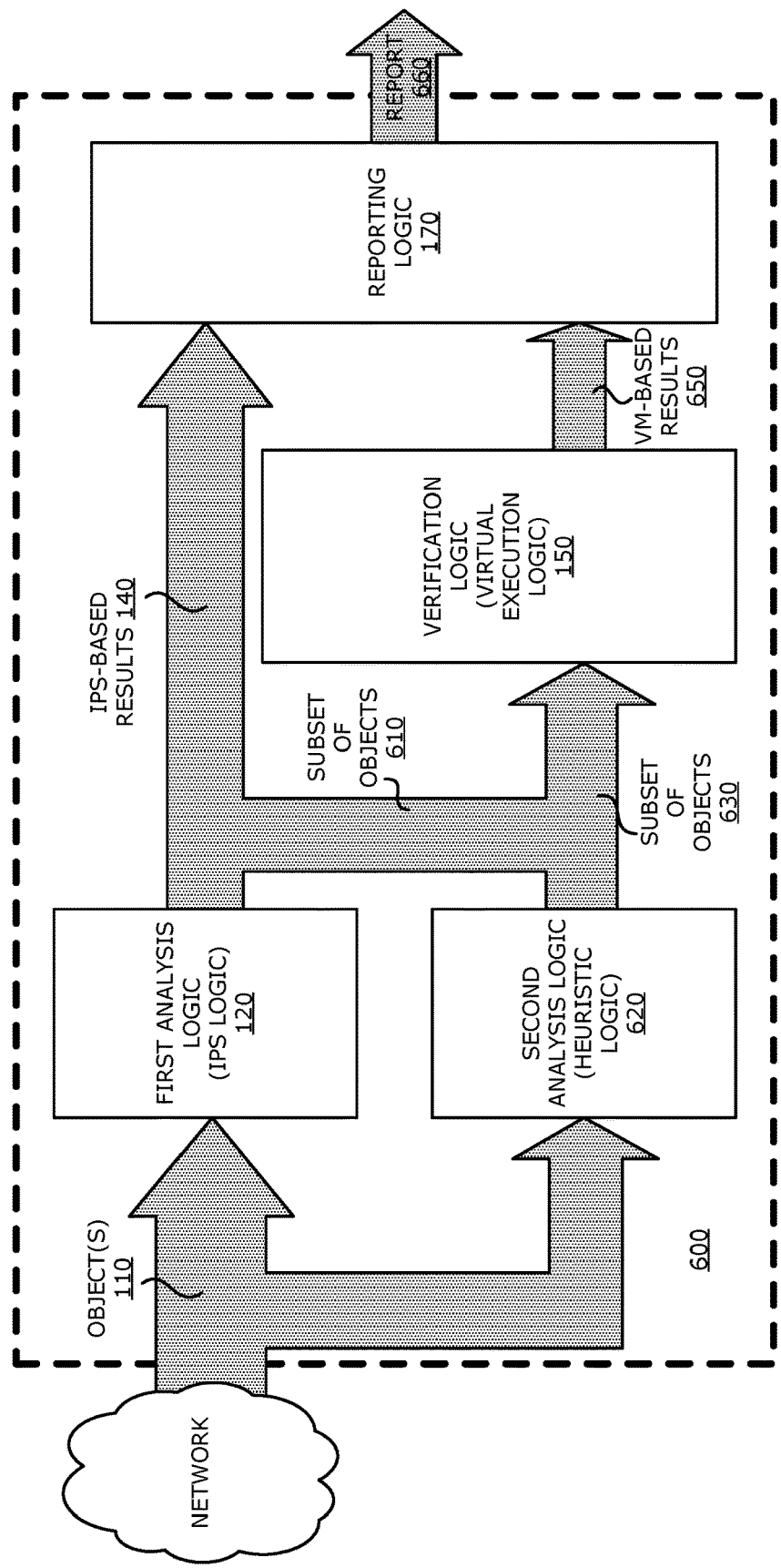
FIGS. 6A-6B are exemplary block diagrams of operational flows of analyzed objects associated with network traffic in accordance with an alternative embodiment of the TCP system.
Figure 6B:
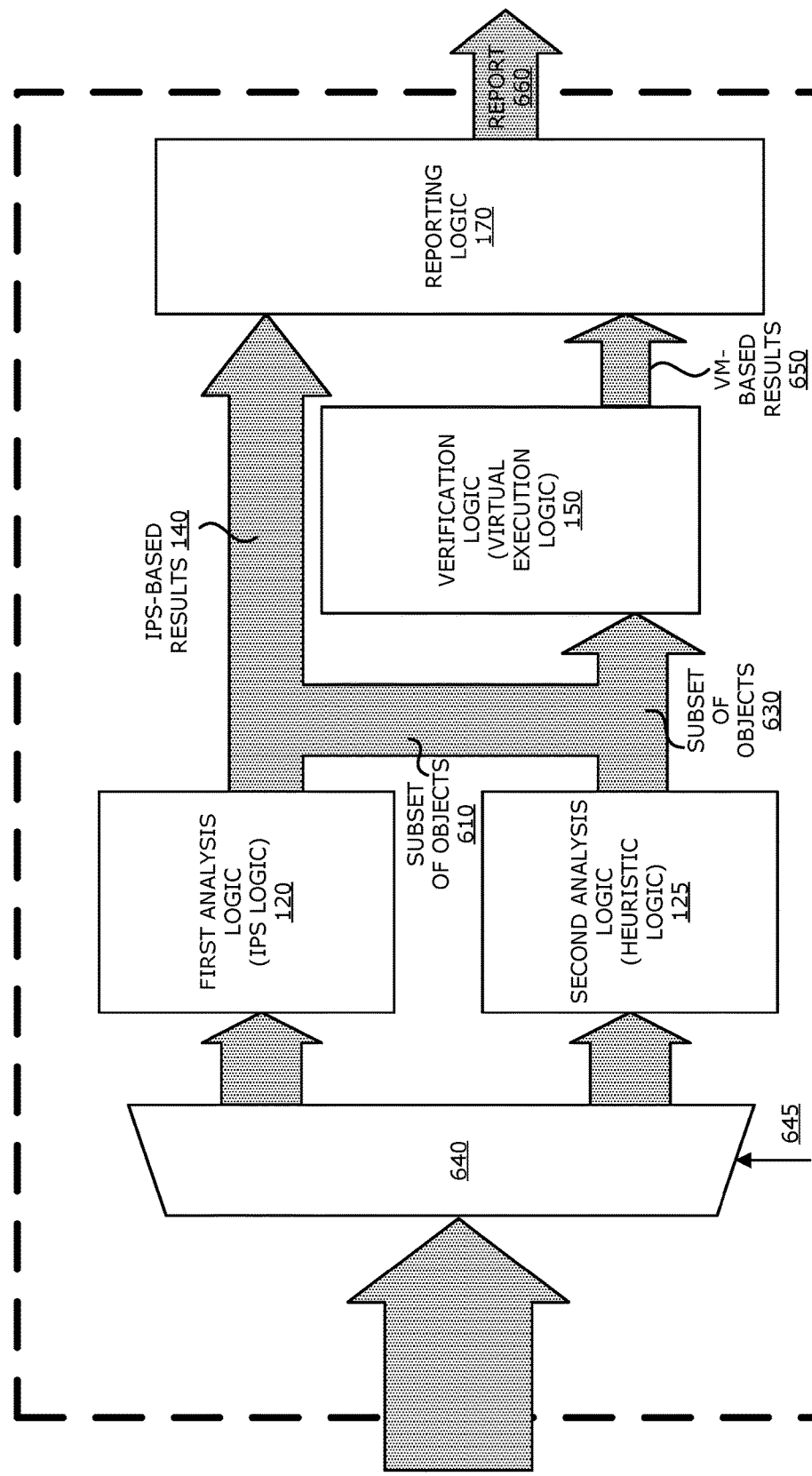

Referring to FIG. 6A, an exemplary block diagram of an operational flow of threat detection and prevention within an electronic device 600 is shown. Herein, some or all of the incoming objects 110 associated with the monitored network traffic may be received by a first static analysis logic (e.g., IPS logic 120 of FIG. 1A), as described above. The IPS logic 120 is configured to perform at least exploit signature checks and/or vulnerability signature checks on some or all of the incoming objects 110.

Upon identifying that a first subset 610 of the incoming objects 110 are "suspicious" (e.g., one or more objects 110 match an exploit signature and/or vulnerability signature), the IPS logic 120 subsequently routes the first subset of suspect objects 610 to the verification logic 150 (e.g., virtual execution logic). Each of these objects may be accompanied by a tag identifier (tag_ID1) and provided to the verification logic 150.

Besides being used for subsequently locating the IPS-based results 140 associated with the suspect object (provided from the IPS logic 120 to the reporting logic 170), tag_1D1 may be used to additionally to identify to the verification logic 150 and/or reporting logic 170 that these suspect objects 610 are provided from the IPS logic 120.

Such information may be useful for identifying exploit information associated with verified exploits originating from the IPS logic, where this exploit information may be highlighted even differently than exploit information associated with verified exploits originating from a second static analysis logic 620.

Operating in tandem or in parallel with IPS logic 120, the second static analysis logic 620 (e.g., heuristic logic) conducts another type of static analysis on some or all of the objects 110 to produce a subset of objects 630 having characteristics indicative of an exploit. Hence, when operating in parallel, heuristic logic 620 may receive the incoming objects 110, which are also being received and analyzed by IPS logic 120. When operating in tandem with the IPS logic 120, the heuristic logic 620 may receive some or all of the incoming objects 110, where the switching between receipt of specific incoming objects by either the IPS logic 120 or the heuristic logic 620 may be conducted by switching logic 645 via control signals 647 from scheduler 260 or some other logic within TDP system $210_1$, as shown in FIG. 6B.

The suspect objects 610 and/or 630 (collectively referred to as "suspect objects 635"), detected by the IPS logic 120 and/or heuristic logic 620, are routed to the verification logic 150. The verification logic 150 is adapted to verify whether any of the suspect objects is an exploit through virtual processing of the content within these objects 635. The VM-based results 650 of this analysis are output from the verification logic 150 for subsequent use by reporting logic 170 for display purposes, as described above.

More specifically, the first static analysis logic (e.g., IPS logic 120) conducts at least exploit signature checks and/or vulnerability signature checks to identify whether characteristics of any of the analyzed objects 110 are indicative of an exploit. If so, the IPS logic 120 forwards these suspect object(s) 610 to the verification logic 150.

Additionally, one or more heuristic checks may be conducted on some or all of objects 110, including various scanning operations conducted on portions of the objects to determine correspondence with one or more malicious identifiers, as described above. While the IPS logic 120 is adapted to identify objects in accordance with at least exploit signature checks and/or vulnerability signature checks, the heuristic checks are directed to a more expansive static analysis of some or all of objects 110, including the use of different types of signatures or other static analysis schemes.

After performing the heuristic check(s) by the heuristic logic 620, a second set of suspect objects 630 is provided to the verification logic 150. Again, the second set of objects 630 may be lesser (and potentially significantly less) in number than the incoming objects 110.

After virtual processing of content within each of the suspect objects 610 and/or 630, and thereafter verifying that particular objects are exploits (verified exploits), the verification logic 150 provides VM-based results 650 that may be modified, along with its corresponding IPS-based results 140, to generate a report 660 (e.g., one or more display screens, printed report, etc.). The report 660 is configured to visibly highlight exploit information associated with verified exploits. As an alternative, the report 660 may also be configured to visibly highlight exploit information associated with verified exploits from exploit information associated with non-verified exploits (suspect objects having characteristics of exploits that were not verified by the VMs).

B. General Architecture

Figure 7A:
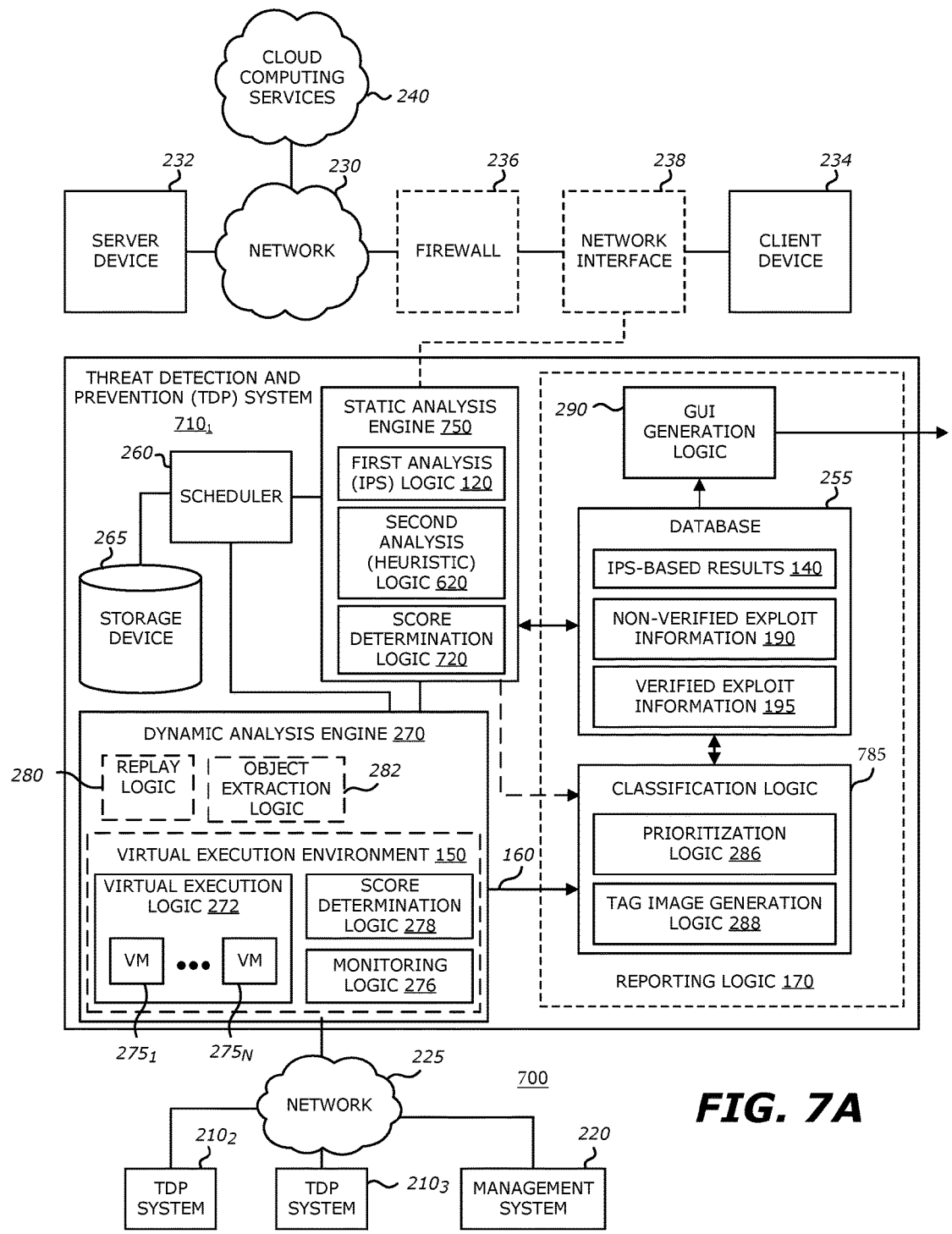
FIGS. 7A-7B are exemplary block diagrams of a communication system deploying a plurality of threat detection and prevention (TDP) systems with a framework for conducting exploit analysis using intrusion protection system (IPS) logic and heuristic logic with results verified by the virtual execution logic pursuant to the alternative embodiment.
Figure 7B:
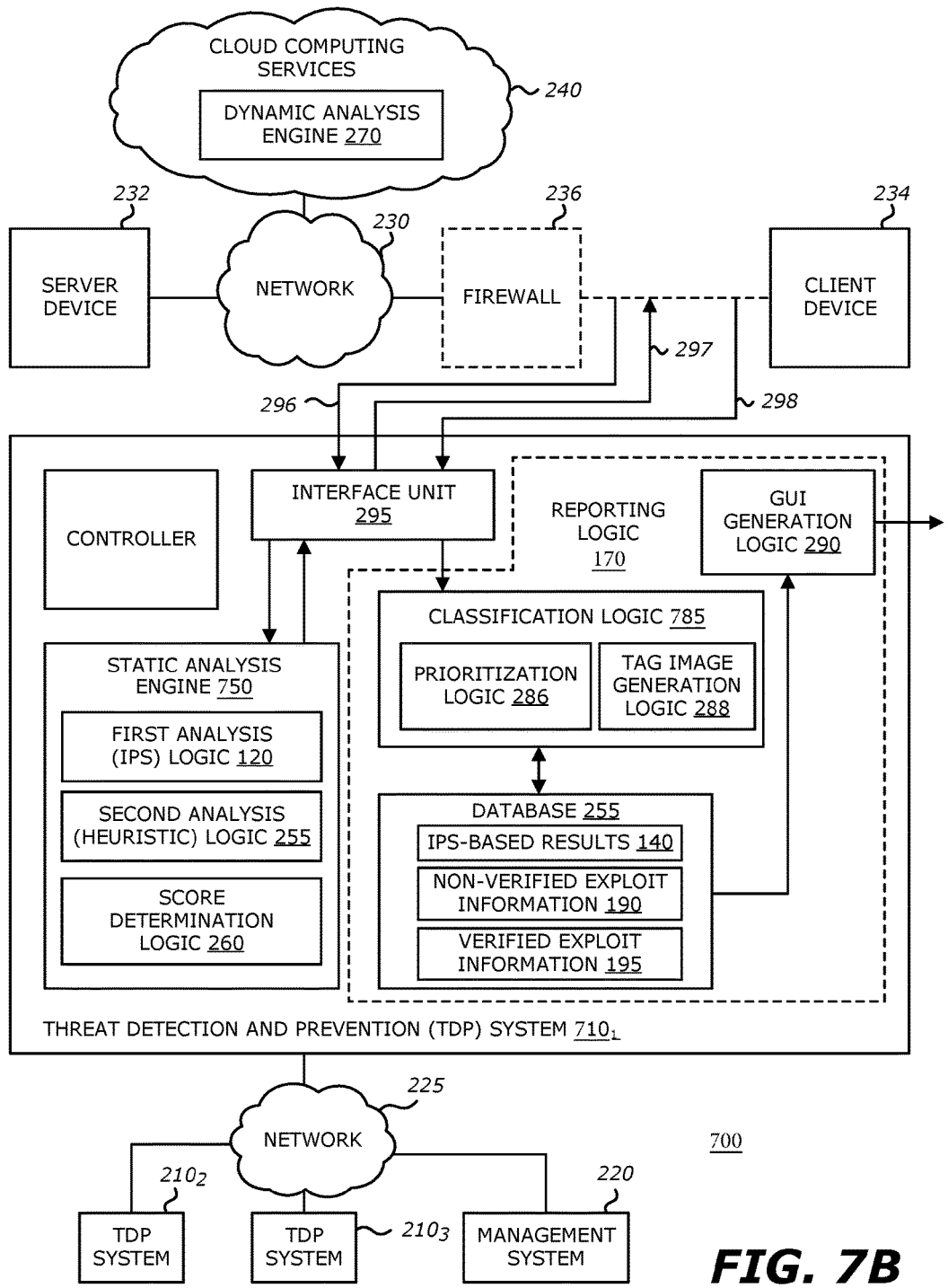

Referring to FIG. 7A, an exemplary block diagram of a communication system 700 deploying a plurality of threat detection and prevention (TDP) systems $710_1$-$710_N$ (N>1, e.g., N=3) is shown. TDP system $710_1$ is identical to TDP system $210_1$ of FIG. 2A, except that static analysis engine 750 includes two different static analysis logic units. More specifically, as shown in FIGS. 7A and 7B, static analysis engine 750 may include one or more software modules that, when executed by one or more processors, performs multilevel static scanning on a particular object, namely both exploit and vulnerability signature checks by IPS logic 120 and heuristic checks by heuristic logic 620.

Operating in parallel or tandem with IPS logic 120, the heuristic logic 620 is configured to conduct one or more heuristic checks on objects under analysis. These heuristic checks may be considered more expansive in analysis than the exploit and/or vulnerability checks conducted by the IPS logic 120 as mentioned above.

Herein, based on the results of the heuristic checks conducted by heuristic logic 620, score determination logic 720 determines the probability (or level of confidence) that the characteristics of the analyzed object are indicative of an exploit. In other words, score determination logic 720 is configured to generate a value that classifies the threat level of the possible exploit characterized by each of the analyzed objects. For instance, if the heuristic checks detect one type of characteristic that suggests the object under analysis is an exploit, the object may be classified with a first threat level. The first threat level may be represented by a score (value) corresponding to the likelihood of the object being an exploit (e.g., score of 3 out of 10). However, if the heuristic checks detect multiple characteristics or another type of characteristic that more strongly suggests the object under analysis is an exploit, a higher score (e.g., score of 8 out of 10) may be assigned by score determination logic 720 to denote a higher probability of the detected presence of an exploit.

Thereafter, the objects and their corresponding scores may be routed from the static analysis engine 750 to the dynamic analysis engine 270 for use in further analysis to verify which of the suspect objects, if any, are exploits. Additionally or in the alternative, it is contemplated that the score may be provided to classification logic 785 for use in prioritization.

More specifically, after static scanning has completed, the object may be provided to the dynamic analysis engine 270 for in-depth dynamic analysis using virtual machines (VMs) $275_1$-$275_M$ (M>1). Of course, if the characteristics of the object are not indicative of an exploit, the heuristic logic 620 may halt further analysis of content with the object.

In general, besides receiving VM-based results 160 from dynamic analysis engine 270, the classification logic 785 may be configured to receive assigned scores from static analysis engine 750. Classification logic 785 may be configured to mathematically combine the scores assigned to content associated with the suspect object (based on findings from static analysis engine 750 and dynamic analysis 270) to obtain an overall score that is assigned with the verified or non-verified exploit.

According to one embodiment of the disclosure, the overall score may be used, at least in part, to identify verified exploits from non-verified exploits. Also, the score may be used, at least in part, for highlighting operations such as assigning a display priority that may influence the display ordering as described above. However, it is contemplated that other parameters, combined with or separate from the score assigned to the exploit, may be used to classify exploits or influence display priority. For instance, the overall score along with other parameters, such as the presence of the tag_ID1 or tag_ID2 as part of exploit information included in the VM-based results, may influence the display ordering of that exploit.

Referring now to FIG. 7B, first TDP system $710_1$ may be coupled with the communication network 230 in line with client device 234. As similarly illustrated in FIG. 2B, first TDP system $710_1$ comprises an interface unit 295 that directs signaling on communication network 230 to static analysis engine 750 or classification logic 785, given that the dynamic analysis engine 270 is deployed in cloud computing services 240.

C. Display and Prioritization of Detected Exploits

Figure 8A:
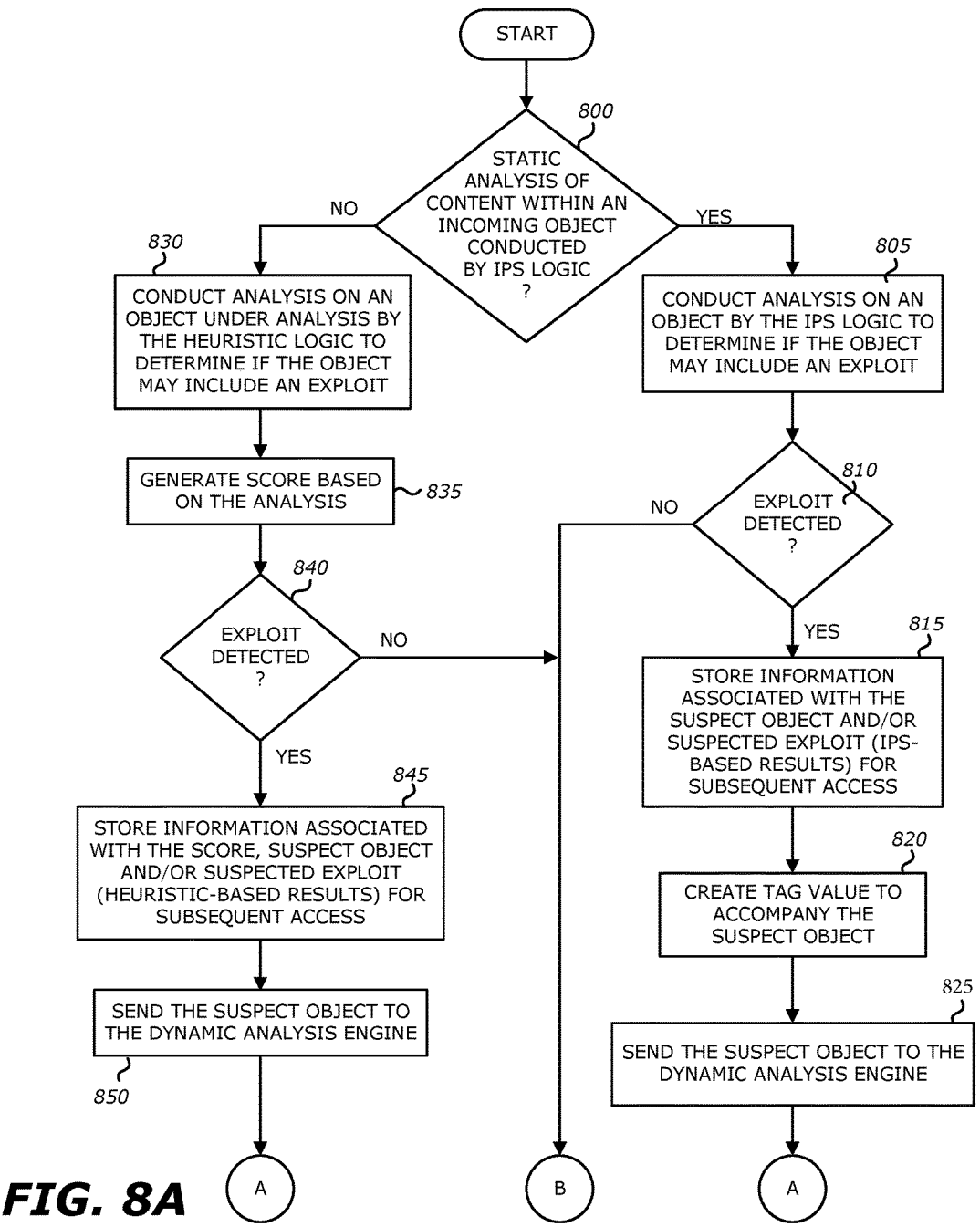
FIGS. 8A-8B are exemplary diagrams of a flowchart illustrating operations of the threat detection and prevention process according to the framework of FIGS. 7A-7B.
Figure 8B:
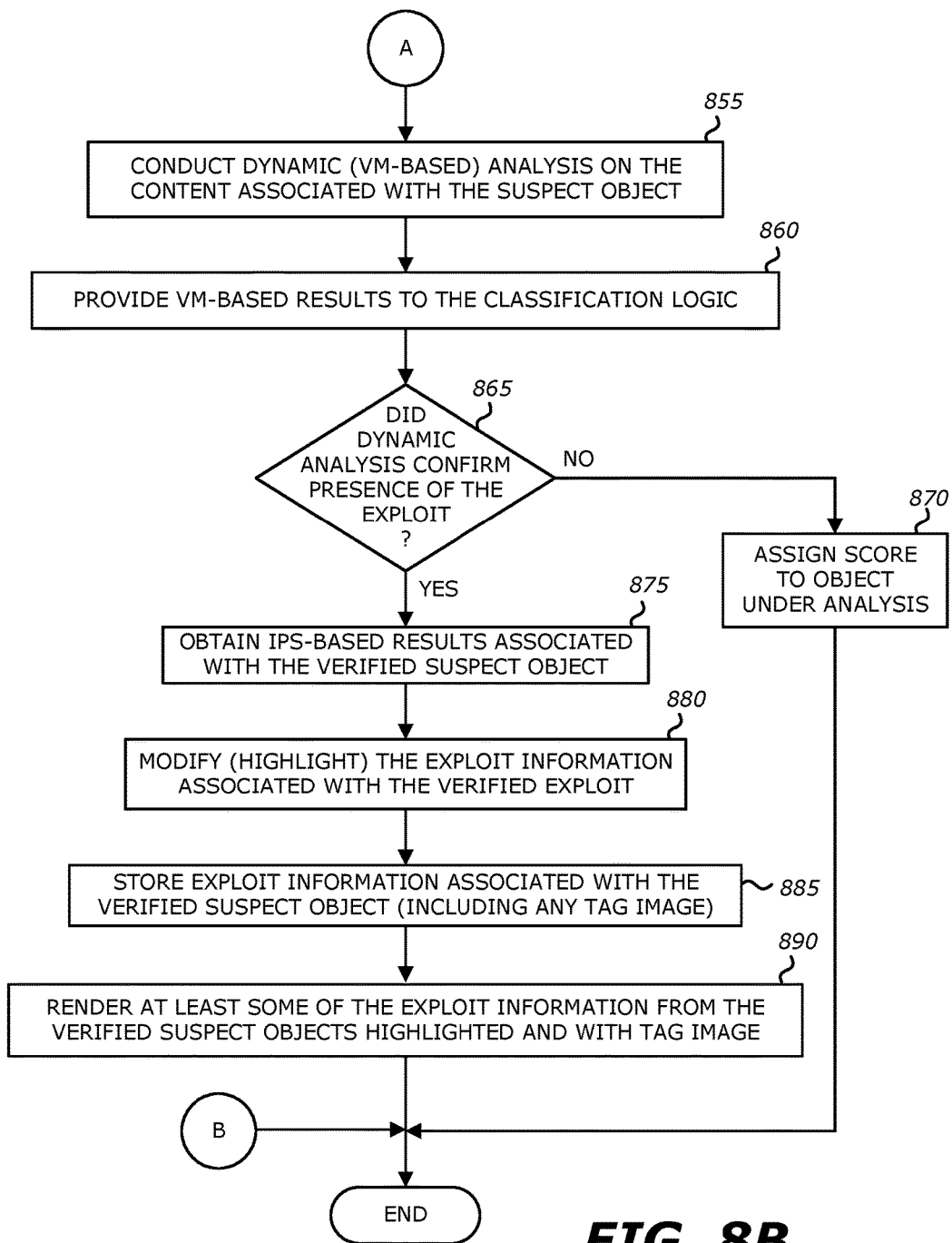

Referring to FIGS. 8A-8B, an exemplary diagram of a flowchart illustrating a threat detection and prevention process, utilizing IPS logic and/or heuristic logic for static analysis, is shown, where the process generates a report that highlights information associated with suspected exploits detected by the IPS or heuristic logic and verified by the virtual execution environment. Herein, the IPS logic and the heuristic logic may operate in parallel or in tandem.

The IPS logic and heuristic logic may be configured to operate in parallel (or in tandem) based on factors that may warrant increased scrutiny in efforts to detect exploits. For instance, there is an increased amount of objects originating from a certain geographic location prone to exploits or from a certain IP address that has been identified as a malicious source. For parallel processing, operations associated with blocks 805-825 and 830-855 of FIG. 8A are conducted in parallel. For this discussion, however, the IPS logic and heuristic logic are operating in tandem. Also, for certain governmental agencies, its sensitivity to exploits and/or its history in experiencing exploits may warrant additional analysis.

Upon receipt of an object under analysis, as set forth in block 800, the TDP system conducts a determination as to whether the static analysis should be conducted by the first static analysis logic UPS logic) and/or the second static analysis logic (heuristic logic). According to one embodiment, as a default, the IPS logic is selected.

When selected, the IPS logic conducts exploit signature checks and/or vulnerability signature checks to determine whether characteristics of the object under analysis are indicative of an exploit (block 805). Upon determining that the characteristics of the object under analysis are indicative of an exploit, information associated with the suspect object and/or exploit (IPS-based results) is stored for subsequent access (blocks 810 and 815).

Although not shown, when determining that the suspect object has characteristics of a suspected exploit, the IPS logic may be configured to block the object from proceeding to the targeted client device, although blocking may be delayed until completion of the VM-based analysis. This blocking functionality may be adjusted by the network administrator based on the severity/type of suspected exploit, number of occurrences of this type of exploit within a prescribed time period, or the like, Furthermore, prior to performing further exploit analysis, as an optional feature identified by dashed lines in FIG. 8A, tag_ID1 may accompany the suspect object when output from the IPS logic so that (1) the IPS-based results for the suspect object can be related to the subsequent VM-based results for that object and (2) the virtual execution logic and/or classification logic can identify that the suspect object originated from the IPS logic (block 820). Thereafter, the suspect object and/or tag_ID1 is provided to the dynamic analysis engine for subsequent analysis (block 825).

Additionally or in the alternative, a second static analysis may be performed to determine whether characteristics of the object under analysis are indicative of an exploit (block 830). This determination may involve one or more heuristic checks being conducted in efforts to determine if the (i) the object has a certain level of correlation with one or more malicious identifiers or (ii) presence, absence or modification of any content associated with the object identifies a potential exploit. During such analysis, a score may be assigned to identify the likelihood of this object being an exploit (block 835).

In the event that the suspect object is tagged for VM-based analysis, which may be determined if the assigned score is greater than or equal to a prescribed threshold score, information associated with the suspect object and/or the potential exploit including the score (hereinafter referred to as "heuristic-based results") may be stored for subsequent access by classification logic (blocks 840 and 845). Thereafter, the suspect object, optionally with tag_ID2, is provided to the dynamic analysis engine for subsequent analysis (blocks 850 and 855).

Regardless whether the static analysis is conducted by the IPS logic or the heuristic logic, the suspect object may be further analyzed by conducting VM-based analysis on the content associated with the suspect object, where behaviors of the virtual processing of the content by one or more VMs produces VM-based results (blocks 860 and 865). If the VM-based analysis fails to detect any exploit within content of the suspect object, a score may be assigned to denote that no exploit is detected and the VM-based results may be stored (blocks 870 and 875).

However, when the dynamic analysis engine verifies (during virtual processing of the content within the suspect object) that the suspect object constitutes an exploit, this "verified" exploit is assigned a score representative of the likelihood and/or threat level for the detected exploit(s). More specifically, during subsequent analysis of the content within the suspect object by the virtual execution logic, upon determining that the suspect object is an exploit (e.g., a certain probability that content within the suspect object constitutes an exploit is determined), a score representative of the likelihood and/or threat level for the detected exploit is assigned.

Thereafter, according to one embodiment of the disclosure, the IPS-based results along with the VM-based results are obtained and some or all of the information from the IPS-based results and the VM-based results may be promi- nently displayed (highlighted) as illustrated in blocks 880 and 885 and further described above.

Thereafter, the (highlighted) verified exploit information is uploaded into the database for storage and now accessible by display logic for rendering (blocks 890 and 895).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon instructions, the instructions being executable by one or more processors of a threat detection system to perform operations comprising:
   filtering, by an intrusion protection system (IPS), received objects by identifying a first plurality of received objects as suspicious objects;
   determining a first subset of the suspicious objects that includes one or more verified malicious objects by monitoring processing of the suspicious objects within a virtual machine for behaviors indicative of the one or more verified malicious objects; and
   providing a report to one or more endpoint devices for display on a display device, the report includes a display of information associated with the one or more verified malicious objects in a first window and a display of information associated with a second subset of the suspicious objects including one or more non-verified malicious objects in a second window, different than the first window.

2. The non-transitory computer readable storage medium of claim 1, wherein the report includes a listing of a first object comprising a first malicious object being highlighted compared to a second object of the suspicious objects.

3. The non-transitory computer readable storage medium of claim 1, wherein the report includes a name of at least one of the one or more verified malicious objects.

4. The non-transitory computer readable storage medium of claim 1, wherein the report includes a signature pattern associated with at least one of the one or more verified malicious objects.

5. The non-transitory computer readable storage medium of claim 1, wherein the report includes addressing information of a source device of at least one of the one or more verified malicious objects.

6. The non-transitory computer readable storage medium of claim 5, wherein the addressing information of the source device includes a geographic location of a source of a first suspicious object of the suspicious objects corresponding to at least one of the one or more verified malicious objects.

7. The non-transitory computer readable storage medium of claim 5, wherein the addressing information of the source device includes addressing information of an intermediary device that received a first suspicious object of the suspicious objects corresponding to at least one of the one or more verified malicious objects.

8. The non-transitory computer readable storage medium of claim 1, wherein a field included in the report, when selected, provides information associated with detected attacks within a network associated with a selected malicious object.

9. The non-transitory computer readable storage medium of claim 1, wherein a field included in the report, when selected, provides information directed to a recommended remediation technique for a selected malicious object.

10. The non-transitory computer readable storage medium of claim 1, wherein the report includes a listing of a severity level of at least one of the one or more verified malicious objects.

11. The non-transitory computer readable storage medium of claim 1, wherein the report includes a listing of a software type detected to be vulnerable to at least one of the one or more verified malicious objects.

12. The non-transitory computer readable storage medium of claim 1, wherein the display of information associated with the one or more verified malicious objects includes one or more highlighted objects, wherein highlighting of the one or more highlighted objects is in accordance with a prescribed threat level assigned to each object of the one or more highlighted objects.

13. The non-transitory computer readable storage medium of claim 1, wherein at least one of the first subset of the suspicious objects that includes a first verified malicious object of the one or more verified malicious objects is an exploit.

14. An electronic device comprising:
one or more processors; and
a memory coupled to the one or more processors, the memory including instructions, the instructions being executable by the one or more processors to perform operations, comprising:
filter received objects by identifying a first plurality of received objects as suspicious objects with an intrusion protection system (IPS);
determine a first subset of the suspicious objects includes one or more verified malicious objects by monitoring processing within a virtual machine of the first plurality of the received objects for behaviors indicative of the one or more verified malicious objects; and
provide a report to one or more endpoint devices for display on a display device, the report includes a display of information associated with the one or more verified malicious objects in a first window and a display of information associated with a second subset of the suspicious objects including one or more non-verified malicious objects in a second window, different than the first window.

15. The electronic device of claim 14, wherein the report includes addressing information of a source device of the one or more verified malicious objects.

16. The electronic device of claim 15, wherein the addressing information of the source device includes a geographic location of a source of a first malicious object of the one or more verified malicious objects.

17. The electronic device of claim 15, wherein the addressing information of the source device includes addressing information of an intermediary device that received a suspicious object corresponding to a first malicious object of the one or more verified malicious objects.

18. The electronic device of claim 14, wherein the report includes a listing of a software type detected to be vulnerable to a first malicious object of the one or more verified malicious objects.

19. The electronic device of claim 14, wherein the display of information associated with the one or more verified malicious objects includes one or more highlighted objects, wherein highlighting of the one or more highlighted objects is in accordance with a prescribed threat level assigned to each object of the one or more highlighted objects.

20. The electronic device of claim 14, wherein at least one of the first subset of the suspicious objects that includes a first verified malicious object of the one or more verified malicious objects is an exploit.

21. A computerized method comprising:
filtering received objects by identifying a first plurality of the received objects as suspicious objects with an intrusion protection system (IPS);
determining a first subset of the suspicious objects includes one or more verified malicious objects by monitoring processing within a virtual machine of the suspicious objects for behaviors indicative of the one or more verified malicious objects; and
providing a report to one or more endpoint devices for display on a display device, the report includes a display of information associated with the one or more verified malicious objects in a first window and a display of information associated with a second subset of the suspicious objects including one or more non-verified malicious object in a second window, different than the first window.

22. The computerized method of claim 21, wherein the report includes addressing information of a source device of a selected malicious object.

23. The computerized method of claim 22, wherein the addressing information of the source device includes a geographic location of a source of the selected malicious object.

24. The computerized method of claim 22, wherein the addressing information of the source device includes addressing information of an intermediary device that received the selected malicious object.

25. The computerized method of claim 21, wherein the report includes information that identifies one or more highlighted objects of the first subset of the suspicious objects, wherein highlighting of the one or more highlighted objects is in accordance with a prescribed threat level assigned to each object of the first subset of the suspicious objects.

26. The computerized method of claim 21, wherein at least one of the first subset of the suspicious objects that includes a first verified malicious object of the one or more verified malicious objects is an exploit.

27. A computerized method comprising:
filtering, during a first analysis, received objects to identify a first plurality of the received objects as suspicious objects;
determining, during a second analysis, a first subset of the suspicious objects that includes one or more verified malicious objects by monitoring processing of the suspicious objects for behaviors indicative of the one or more verified malicious objects; and
providing a report to one or more endpoint devices for display on a display device, the report includes a display of information associated with the one or more verified malicious objects in a first window and a display of information associated with a second subset of the suspicious objects including one or more non-verified malicious objects in a second window, different than the first window.

28. The computerized method of claim 27, wherein the report includes a listing of one or more highlighted objects, wherein highlighting of the one or more highlighted objects is conducted in accordance with a prescribed threat level assigned to each object of the first subset of the suspicious objects.

29. The computerized method of claim 24, wherein at least one of the first subset of the suspicious objects that includes a first verified malicious object of the one or more verified malicious objects is an exploit.

30. A threat detection system, comprising:
one or more processors; and
a storage device communicatively coupled to the one or more processors and having stored thereon logic configured to be executed by the one or more processors, the logic including:
an intrusion protection system (IPS) logic, upon execution by the one or more processors, configured to receive a first plurality of objects and analyze the first plurality of objects to identify a second plurality of objects as potentially malicious, the second plurality of objects being a subset of the first plurality of objects and being lesser or equal in number to the first plurality of objects,
a virtual execution logic, upon execution by the one or more processors, including at least one virtual machine configured to process content within each of the second plurality of objects and monitor for anomalous behaviors during the processing that are indicative of maliciousness to determine that a first subset of the second plurality of objects includes one or more verified malicious objects, and
a reporting logic, upon execution by the one or more processors, configured to provide a display of information associated with the one or more verified malicious objects, wherein the reporting logic comprises display generation logic that generates a display of information associated with the one or more verified malicious objects in a first window and a display of information associated with a second subset of the second plurality of objects including one or more non-verified malicious objects in a second window, different than the first window.

31. The threat detection system of claim 30, wherein the display of the information associated with the one or more verified malicious objects includes an interactive dashboard having: (1) a first display area illustrating (i) a name of a first verified malicious object of the one or more verified malicious objects, (ii) a time associated with detection of the first verified malicious object, and (iii) a pattern used to detect or verify the first verified malicious object, and (2) a second display area providing access to additional information regarding a selected verified malicious object.

32. The threat detection system of claim 30, wherein at least one of the one or more verified malicious objects is an exploit.

* * * * *